(12) United States Patent
Ichihara et al.

(10) Patent No.: US 8,153,189 B2
(45) Date of Patent: Apr. 10, 2012

(54) STRUCTURE AND PROCESS FOR PRODUCTION THEREOF

(75) Inventors: Shigeru Ichihara, Tokyo (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 791 days.

(21) Appl. No.: 11/687,209

(22) Filed: Mar. 16, 2007

(65) Prior Publication Data

US 2007/0160824 A1    Jul. 12, 2007

Related U.S. Application Data

(63) Continuation-in-part of application No. 11/389,226, filed on Mar. 27, 2006, now abandoned.

(30) Foreign Application Priority Data

Mar. 31, 2005   (JP) .................................. 2005-102597
Sep. 16, 2005   (JP) .................................. 2005-270286
May 2, 2006    (JP) .................................. 2006-128357

(51) Int. Cl.
*B32B 3/26*      (2006.01)
(52) U.S. Cl. ........................................ 427/128; 427/130
(58) Field of Classification Search .................. 427/128, 427/129, 130, 131, 132, 502; 360/135; 428/304.4
See application file for complete search history.

(56) References Cited

U.S. PATENT DOCUMENTS

| 4,093,453 A * | 6/1978 | Makino et al. ................ 148/527 |
| 2004/0048092 A1* | 3/2004 | Yasui et al. .................... 428/642 |
| 2004/0196593 A1* | 10/2004 | Yasui et al. .................... 360/135 |
| 2005/0100765 A1 | 5/2005 | Mukai .......................... 428/694 |

FOREIGN PATENT DOCUMENTS

JP    2003-317220      11/2003
WO   WO 2004/034385 A1    4/2004

* cited by examiner

*Primary Examiner* — Michael Cleveland
*Assistant Examiner* — Tabassom Tadayyon Eslami
(74) *Attorney, Agent, or Firm* — Fitzpatrick, Cella, Harper & Scinto

(57) ABSTRACT

A novel structure is provided in which an ordered alloy material is filled in pores of the structure. A process for producing the structure is also provided. The process comprises a first step for forming an alloy in pores of a porous layer, a second step for forming a film composed of a second material on the porous layer, and a third step for heat-treating the porous layer having the film. Further a process is provided for producing a structure containing fine $L1_0$-crystal grains with a low-temperature heat treatment. This process comprises a process for producing a structure containing a magnetic substance dispersed in a nonmagnetic material, comprising: forming a first layer containing a magnetic substance A dispersed in a nonmagnetic material, forming a second layer containing a magnetic substance B on the first layer, and heating the first layer and the second layer during or after formation of the second layer to connect the magnetic substance A and the magnetic substance B to form an ordered alloy.

14 Claims, 9 Drawing Sheets

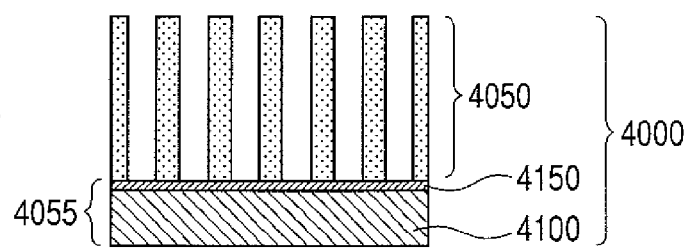
FIG. 4A
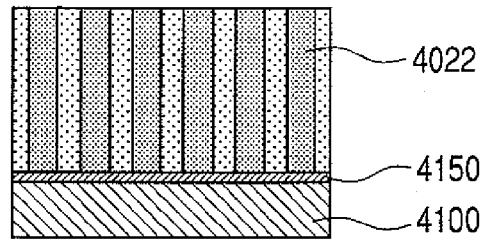
FIG. 4B
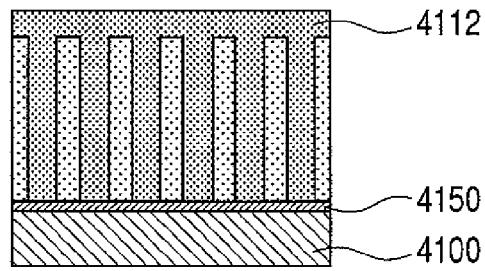
FIG. 4C
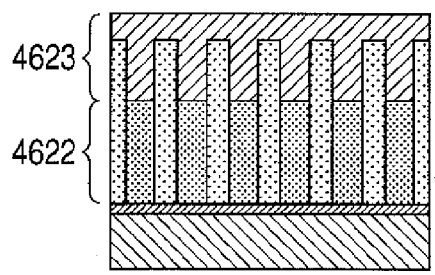
FIG. 4D1
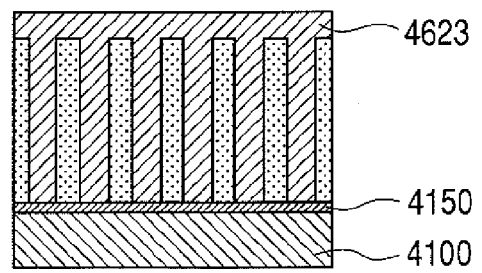
FIG. 4D2
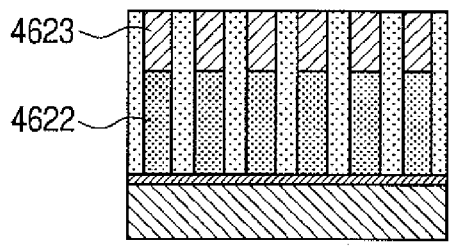
FIG. 4E1
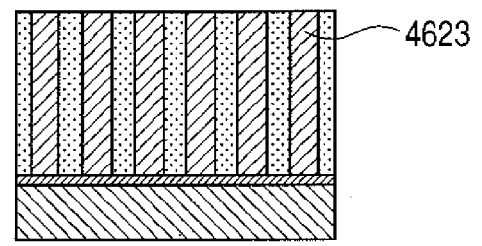
FIG. 4E2

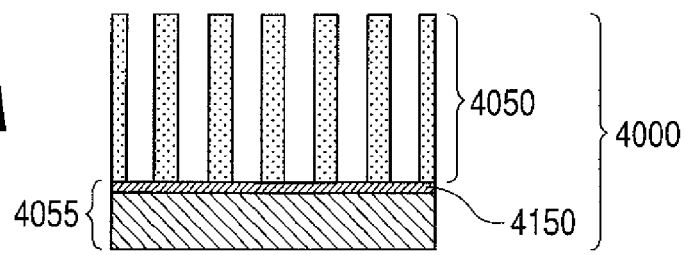
FIG. 6A
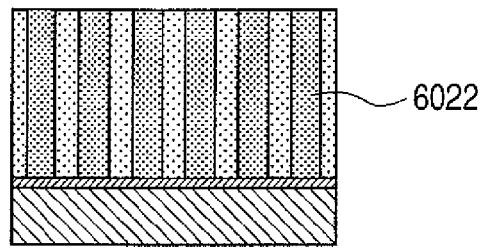
FIG. 6B
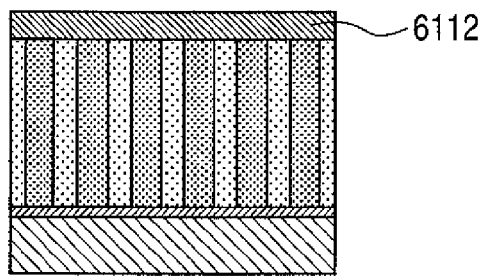
FIG. 6C
FIG. 6D1
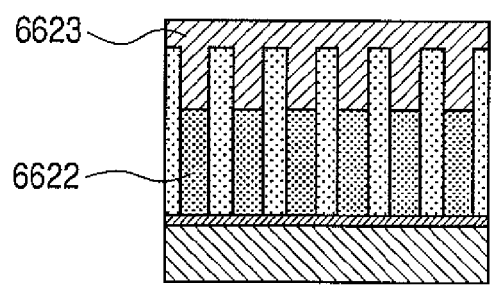
FIG. 6D2
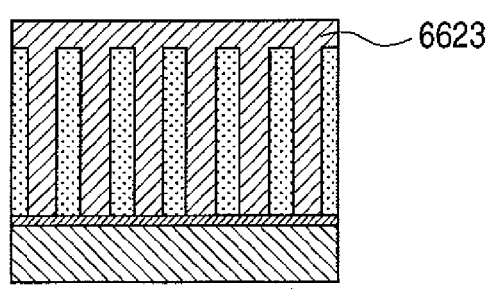
FIG. 6E1
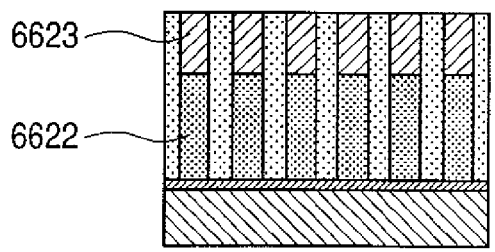
FIG. 6E2
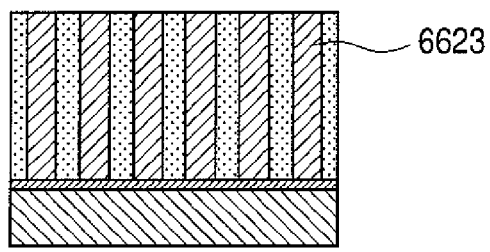

STRUCTURE AND PROCESS FOR PRODUCTION THEREOF

This application is a continuation-in-part application of U.S. patent application Ser. No. 11/389,266 filed on Mar. 27, 2006, Now Abandoned.

BACKGROUND OF THE INVENTION

1. Field of the Invention

The present invention relates to a structure having pores, particularly to a structure useful for forming a recording layer of magnetic recording media.

The present invention relates also to a process for producing a structure, in particular magnetic recording media, in which magnetic ordered alloy particles are arranged in a non-magnetic material.

2. Description of Related Art

With remarkable increase of the amount of information in recent years, magnetic recording devices like hard disk drives (HDDs) are required to have a higher recording density and a larger recording capacity. In a recording apparatus, constitution of the recording unit (one bit) from many magnetic particles improves the recording resolution and decreases the recording noise to realize a higher recording density. For formation of such a recording unit, the size of the magnetic particles in the recording medium should be micronized. However, the micronization of the magnetic fine particles makes significant the thermal energy retained in the particle relative to the magnetic energy. This produces a superparamagnetic effect (thermal fluctuation) to cause dissipation of magnetic record disadvantageously. To stabilize the magnetic record against the thermal fluctuation, magnetic recording media are being developed which are constituted of fine particles having a large magnetic anisotropy constant (Ku).

The hard disk which is a main recording device of a personal computer has been improved to have remarkably high recording density. The hard disks are investigated for use as the recording medium, not only for the PC but also for digital household electric appliances and mobile terminals, and are promising for higher recording density.

The hard disk conventionally used is of a longitudinal recording system in which magnetization is held in the disk face direction in the disk. In this system, the magnetic recording layer should be thin to prevent decrease of the demagnetization field in the magnetic domains. The decrease of the thickness of the magnetic recording layer results in decrease of the volume of the magnetic particles contained therein. This makes non-negligible the thermal energy of the particles in comparison with the magnetic energy retained therein. That is, the longitudinal recording type of hard disk having a thin magnetic recording medium will be affected remarkably by superparamagnetism (thermal fluctuation) to dissipate the recorded magnetization.

On the contrary, in the perpendicular recording system in which magnetization is held in a direction vertical to the disk face, the superparamagnetization can be suppressed by keeping the thickness of the layer.

The recording layer of the perpendicular magnetic recording media is conventionally formed mainly from a CoCr type alloy. Recently, however, hard magnetic ordered alloys of a CuAu type (hereinafter referred to as an "$L1_0$ type") or a $Cu_3Au$ type (hereinafter referred to as an "$L1_2$ type") are attracting attention which are capable of suppressing the superparamagnetization even with a smaller size of the recording region and have a high magnetic anisotropic constant.

The material FePt can become an $L1_0$ type ordered alloy. For formation of the $L1_0$ type FePt ordered alloy, a film thereof is heat-treated for ordering. Japanese Patent Application Laid-Open No. 2003-006830 (Patent Document 1) discloses a process in which a continuous film composed of Fe and Pt is formed on a substrate and the film is heat treated at 350° C.

For increasing the recording density, the magnetic exchange bond between the magnetic regions should be broken or weakened. For the purpose, it is effective to isolate the magnetic regions from each other by a non-magnetic material composed of an oxide or the like. Japanese Patent Application Laid-Open No. 2002-175621 (Patent Document 2) prepares an ordered alloy structure by filling a magnetic material like CoPt into pores of a structure constituted of anodized alumina and heat-treating the structure at a temperature of 650° C. This heat treatment temperature is higher than the temperature 350° C. for the ordering of the continuous film as described in Patent Document 1. Therefore, improvement is desired at least to lower the heat treatment temperature below 650° C.

(0004) $L1_0$-ordered alloys such as FePt and CoPt having an $L1_0$ structure are noticed as the material having a high magnetic anisotropy constant of not lower than $1 \times 10^7$ erg/cm$^3$. In particular, the $L1_0$-FePt alloy is noticed which has a magnetic anisotropy constant as high as $7 \times 10^7$ erg/cm$^3$. A film of the FePt alloy formed at room temperature has an fcc disordered crystal structure. This structure will be transformed by heat treatment into an fct ordered structure ($L1_0$ structure). However, the heat treatment can increase the crystal particle size.

The term "a granular structure" signifies a dispersion of spherical crystal members 1022 in matrix member 1012 as illustrated in FIG. 8. Granular structures are being investigated for preparing an ordered alloy structure with simultaneous inhibition of crystal grain growth. The term "a nanogranular structure" signifies a dispersion of nanometric crystal grains in a matrix such as oxides ($SiO_2$, $Al_2O_3$, MgO, etc.).

Japanese Patent Application Laid-Open No. 2001-273622 discloses magnetic recording media employing a nanogranular structure. However, in production of this recording media, crystal particles will grow with progress of ordering of the alloy, making difficult to obtain the granular structure containing $L1_0$-FePt crystal particles of the size of not larger than 10 nm.

Japanese Patent No. 3507892 discloses formation of an alloy of Fe and Pt by lamination of a granular thin film containing Fe fine particles and another granular thin film containing Pt fine particles, and heating up to a prescribed temperature during or after the lamination. This patent document describes a granular structure containing $L1_0$-FePt crystal grains of 10 nm having coersive force (Hc) of not less than 5 kOe obtained by heating to 350° C. or higher. This method, however, still requires heating up to 350° C. or higher for the ordering of the alloy For practical application, ordering of the alloy of the magnetic material is required to be achieved at a lower temperature. Some of the techniques disclosed until now for lowering the temperature for ordering a FePt alloy in a continuous film are described below.

(1) Applied Physics Letters (Mar. 25, 2002), vol. 80, No. 12, pp. 2147-2149, and Journal of Applied Physics (Nov. 15, 2002), vol. 92, No. 10, pp. 6104-6109 disclose addition of a third element such as Cu, Ag, Au, Ir, B, and N to an FePt alloy. Of the third element, Cu and the like become effective by formation of a solid solution in FePt: Ag, Au, and the like are effective in formation of empty holes in the particle by destroying the solid solution.

(2) Applied Physics Letters (Jan. 14, 2002), vol. 80, No. 2, pp. 288-290 discloses alternate lamination of Fe monoatomic layers and Pt monoatomic layers for forming an ordered alloy layer. $L1_0$-FePt has a structure of lamination of Fe and Pt in layers. Controlled lamination in an atomic order enables decrease of the energy for transformation into an ordered structure.

(3) Journal of Applied Physics (Jun. 1, 2001), vol. 89, No. 11, pp. 7065-7067, and Journal of Applied Physics (Dec. 1, 2003), vol. 94, No. 11, pp. 7222-7226 disclose a method of lamination of Fe and Pt in films of several nanometers thick. This method also enables lowering of the ordering temperature by a reason similar to that of the above Method-(2), particularly effectively in film formation with heating.

(4) Applied Physics Letters (Nov. 8, 2004), vol. 85. No. 19, pp. 4430-4432 discloses a method for promotion of the ordering by utilizing the strain energy produced in formation of $Cu_3Si$ from Cu and Si. In this method, a Cu film is formed on a Si substrate at room temperature, and is heat-treated: The dynamic tensile force produced in silicide formation by the heating is effective for the ordering. This method, when applied in the present invention, a similar effect can be achieved by formation of a Cu/Si lamination film on a continuous FePt film.

(5) Applied Physics Letters (Dec. 1, 2003), vol. 83, No. 22, pp. 4550-4552 discloses irradiation of He ions in place of the heat treatment for lowering the ordering temperature.

(6) Applied Physics Letters (Sep. 20, 2004), vol. 85, No. 12, pp. 2304-2306 discloses heat treatment in a magnetic field for promoting the ordering.

(7) Journal of Applied Physics (Jun. 1, 2001), vol. 89, No. 11, pp. 7068-7070, and Applied Physics Letters (Sep. 15, 2003, vol. 83, No. 11, pp. 2196-2198 disclose use of a Ag thin films as the underlying layer and a cap layer for lowering the ordering temperature. Presumably this lowering of the ordering temperature is caused by an elastic energy produced in the interface between FePt and the Ag film as one.

(8) Other methods include increase of the Ar pressure in FePt film formation to promote diffusion of Fe and Pt; increase of the vacuum degree in the film forming apparatus to decrease an impurity not to inhibit the progress of ordering; and decrease of an impurity concentration in the target employed. By any of the above-mentioned methods, the ordering temperature can be lowered by optimizing basic conditions of the film formation.

SUMMARY OF THE INVENTION

The present invention intends to provide a process for producing a structure containing, in pores, an alloy ordered by heat treatment at a temperature lower than 650° C., and to provide a novel structure produced by the process.

According to an aspect of the present invention, there is provided a process for producing a structure containing an ordered alloy in pores in a porous layer comprising the steps of: providing a porous layer-containing member having a porous layer on the surface thereof, filling a first material for being comprised in the alloy into pores of the porous layer, forming a film containing a second material on the porous layer, and heat-treating the member having the film.

According to another aspect of the present invention, there is provided a process for producing a structure containing an ordered alloy in pores in a porous layer comprising the steps of: providing a porous layer-containing member having a porous layer on the surface thereof, filling a first material for being comprised in the alloy into pores of the porous layer, forming on the porous layer-containing member a film from a second material for being comprised in the alloy to be connected with the filled first material and to cover the openings of the pores and the other portions of the porous layer than the openings, and heat-treating the porous layer-containing member with the film covering the openings and the other portions than the openings.

The first material and the second material may be different from each other.

One of the first material and the second material preferably contains at least one element selected from the group consisting of Fe, Co and Ni, and the other one of the first material and the second material contains at least one of the elements of Pt and Pd.

The first material and the second material may be the same.

The ordered structure of the ordered alloy is preferably an $L1_0$ type structure or an $L1_2$ type structure.

The pores of the porous layer are preferably columnar, having an average diameter ranging from 1 nm to 40 nm.

The pore-filling step and the film-forming step are preferably conducted by plating the material constituting the alloy. The plating treatment is preferably conducted to allow the material to overflow from the pores of the porous layer and to allow the material having overflowed to join together to be continuous on the other portions than the openings of the pores.

At least one of the pore-filling step and the film-forming step is preferably conducted by a dry process by use of the material constituting the alloy.

The film formed in the film-forming step on the porous layer-containing member is preferably a continuous film having a thickness of not less than 1 nm.

The process preferably further comprises, after the film-forming step, a step for forming a second film containing a third material on the film. The second film preferably serves to lower the temperature for orientation control and/or ordering of the alloy. Alternatively, the second film is preferably selected from films of ZnO, MgO, and Cu, and lamination films of Cu and Si.

The heat-treating step is preferably conducted in a reductive atmosphere.

The process preferably comprises a step of removing the film from the member.

According to a still another aspect of the present invention, there is provide a process for producing a structure containing an ordered alloy in pores in a porous layer comprising the steps of: providing a porous layer-containing member having a porous layer on a surface, filling a first material for being comprised of the alloy in the pores of the porous layer, forming a film containing a second material on the porous layer to be in contact with the filled first material, and treating the filled first material for formation of an ordered alloy.

According to a further aspect of the present invention, there is provided a structure having a member having a columnar pores on a substrate and containing a filling in the pores, wherein the filling has a first region and a second region in the depth direction of the columnar pore, the first region is an ordered alloy region, and the second region is an ordered alloy region of a lower ordering degree than the first region, non-alloyed region, or a region having an ordered structure different from the first region.

According to a further aspect of the present invention, there is provided recording media having a magnetic layer on a substrate, wherein the magnetic layer is constituted of a first magnetic layer and a second magnetic layer; in the first magnetic layer, a first magnetic material is distributed in a non-magnetic material, and in the second magnetic layer, a second magnetic material is continuous. The first magnetic material and the second magnetic material are preferably different in a magnetic property. Alternatively, the first magnetic layer has preferably a larger coercive force than the second magnetic layer.

The present invention provides a porous structure enclosing an ordered alloy in the pores thereof produced at a heat-treatment temperature lower than in conventional processes.

The present invention intends also to provide a process for producing a structure constituted of fine $L1_0$ crystal grains by a low-temperature heat treatment, and a process for producing magnetic recording media by employing the structure.

The present invention is directed to a process for producing a structure containing a magnetic substance dispersed in a nonmagnetic material, comprising: forming a first layer containing a magnetic substance A dispersed in a nonmagnetic material, forming a second layer containing a magnetic substance B on the first layer, and heating the first layer and the second layer during or after formation of the second layer to connect the magnetic substance A and the magnetic substance B to form an ordered alloy.

The present invention is directed to a process for producing a structure containing a magnetic substance dispersed in a nonmagnetic material, comprising: forming a film member mainly composed of a magnetic substance A composed of one or more elements selected from the group consisting of Fe, Co, and Ni and one or more elements selected from the group of Pt and Pd; and a nonmagnetic material through a gas phase process, forming a continuous film containing a magnetic substance B composed mainly of one or more elements selected from the group consisting of Fe, Co, and Ni and one or more elements selected from the group of Pt and Pd. on the film member; and heating the continuous film growing or having formed during or after formation of the continuous film.

The elements constituting the main component of the magnetic substance A may be the same as the element constituting the main component of the magnetic substance B The magnetic substance A or the magnetic substance B may contain one or more metals selected from the group consisting of Cu, Ag, Au, Ir, B, and N.

The continuous film may have a thickness ranging from 1 nm to 30 nm.

The process may comprise, after formation of the continuous film, additionally a step of forming a second continuous film on the formed continuous film.

The second continuous film may be constituted of ZnO, MgO, Cu, or Ag, or a lamination film of Cu and Si.

The process may comprise a step of removing the continuous film.

The process may comprise a step of soft-magnetizing the continuous film.

The structure may be magnetic recording media.

The present invention provides a porous structure enclosing an ordered alloy in the pores thereof produced at a heat-treatment temperature lower than in a conventional process.

The present invention provides also a structure for high-density recording, without increase of crystal grain size by heat treatment at a temperature lower than in a conventional process.

Further features of the present invention will become apparent from the following description of exemplary embodiments with reference to the attached drawings.

INDUSTRIAL APPLICABILITY

The process of the present invention for producing the structure is useful as a constitution material of a recording medium such as a hard disk and a memory.

BRIEF DESCRIPTION OF THE DRAWINGS

FIGS. 4A, 4B, 4C, 4D1, 4D2, 4E1, and 4E2 are drawings for explaining the process for the production of the present invention.

FIGS. 6A, 6B, 6C, 6D1, 6D2, 6E1, and 6E2 are drawings for explaining the process for the production of the present invention.

In the above drawings, the numerals denote the members as follows: 1000, a base member; 1011, a pore; 1012, a pore wall; 1050, a porous portion; 1055, a non-porous portion; 1122, a film formed on the pore; 1112, a film formed on the pore wall; 1022, a filled matter filled in the pores; and 1200, a second film.

DETAILED DESCRIPTION OF THE INVENTION

The process of the present invention for producing the structure enclosing an ordered alloy in the pores in the porous layer is explained below specifically by reference to FIGS. 1A and 1B.

Figure 1A:
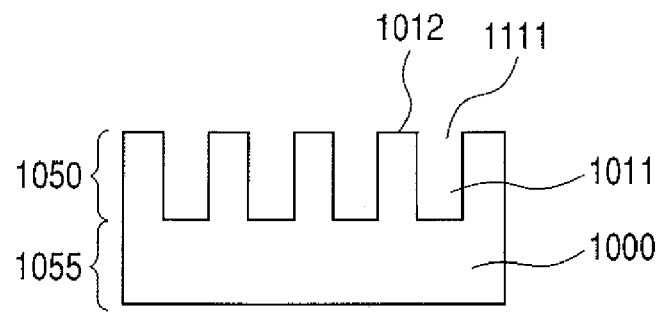
FIGS. 1A and 1B are schematic sectional views for explaining the production process of the present invention.

Base member 1000 is prepared which has a porous layer on the surface as shown in FIG. 1A. The numeral 1011 denotes a pore, and the numeral 1012 denotes the other portions of the porous layer than the openings of the pores (hereinafter referred to as "pore wall". FIGS. 1A and 1B are sectional views. Viewed from the top side of the pores of the base member illustrated in FIGS. 1A and 1B, the pores are dispersed as shown in FIG. 2. The numeral 1111 denotes a pore top in the present invention. In FIG. 2, the numeral 11 denotes a fine pore, and the numeral 12 denotes a pore wall interposed between the pores. This pore wall portion is occasionally called a matrix portion for distributing the pores. The pores are dispersed, or may be regularly distributed.

Figure 1B:
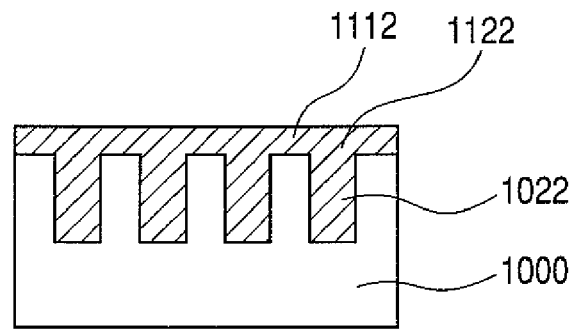
Figure 2:
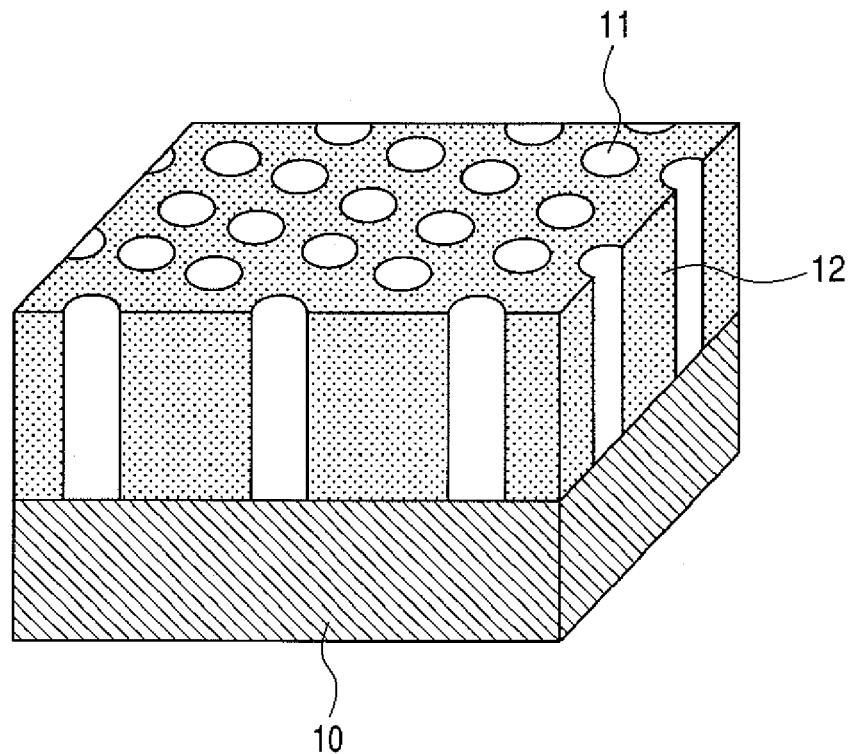
FIG. 2 is a drawing for explaining the structure having fine pores useful in the present invention.
Figure 3:
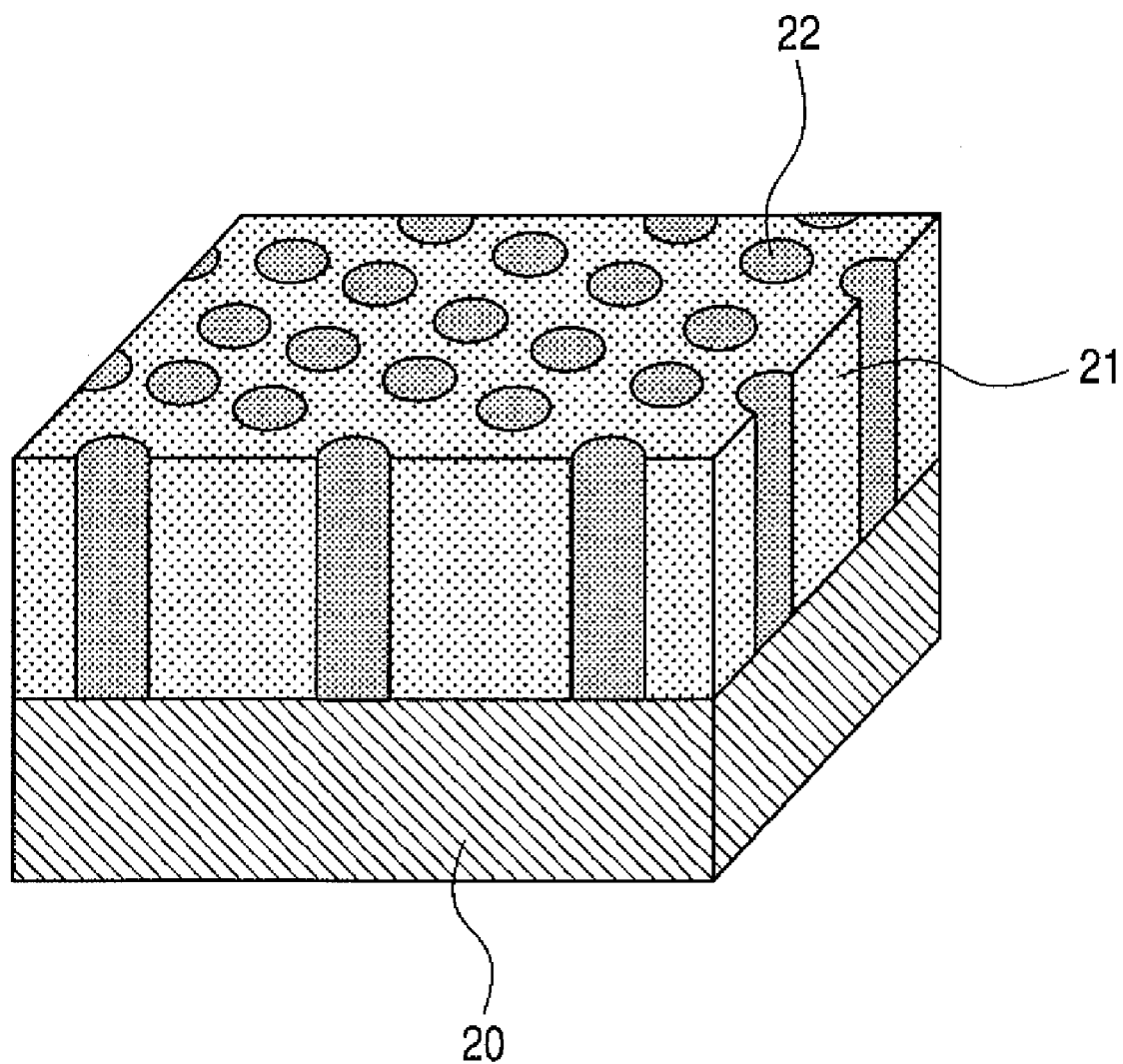
FIG. 3 is a drawing for explaining the structure of the present invention.

A first material constituting the alloy is filled into the pores 1022, and thereon a film of a second material constituting the alloy is formed on the pore tops and the pore wall as shown in FIG. 1B. In FIG. 1B, the numeral 1122 denotes a portion of the film formed on the pore tops, and the numeral 1112 denotes a portion of the film formed on the pore wall. The base member 1000 covered with the film on the pore top and the pore wall of the porous layer as shown in FIG. 1B is heat-treated. Thereby a structure containing an ordered alloy in the pores is produced.

(Base Member)

Figure 7A:
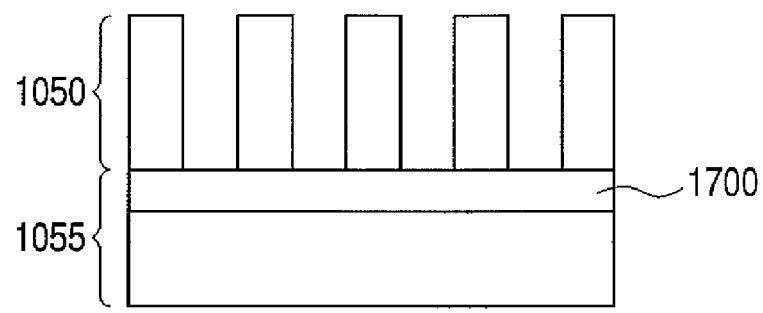
FIGS. 7A, 7B, and 7C are schematic sectional views for explaining the production process of the present invention.

The base member 1000 may be formed on another substrate. A material may be provided which contributes to filling into the pore bottom portions of the pores. In FIG. 1A, the numeral 1050 denotes a porous portion of the base member, and the numeral 1055 denotes a non-porous portion. Between the porous portion and the non-porous portion, a second layer 1700 may be provided as shown in FIG. 7A.

The second layer has preferably a special function such as of controlling the orientation of the filling material.

The second layer may be formed from MgO(001), ZnO (001), or a like substance.

The symbol MgO(001) signifies a crystal of MgO in which the face (001) is parallel to the face of the non-porous portion 1055. Here the face of the non-porous portion 1055 is a face of the nonporous portion vertical to the pore depth direction.

This signifies that, in the MgO crystal, the normal line [001] of the face of the MgO crystal is vertical to the face of the non-porous portion (i.e., parallel to the pore depth direction).

The same is true regarding ZnO(001).

On the MgO(001) layer or the Zn(001) layer under the porous portion 1050, a still another layer may be provided which has an oriented face of (001) face or (111) face of an fcc structure.

The pores in the porous portion are columnar fine pores. The average pore diameter ranges, for example, from 1 nm to 100 nm, preferably from 1 nm to 40 nm. The depth of the pores (the length of the pores in the thickness direction) ranges from 5 nm to 500 nm, preferably not more than 100 nm, more preferably not more than 50 nm, still more preferably not more than 20 nm.

For filling the material into the pores in the porous portion by a dry process such as CVD, not by a wet process like plating, the aspect ratio of the fine pores is not more than 10, preferably not more than 5, still more preferably not more than 2. This is because, by a dry process, the filling of the material into the fine pores of small sectional diameters may be difficult or may take a long time.

The aspect ratio herein signifies the ratio of the length of the fine pore in the depth direction to the diameter in the section perpendicular to the pore depth direction.

The process of the present invention is effective for obtaining an ordered alloy in pores of the porous matter having an average pore diameter of not more than 15 nm and average pore interval between the pores of not more than 20 nm.

The base member is prepared by the method mentioned below.

For example, aluminum or an aluminum-containing alloy is anodized in a solution of oxalic acid, phosphoric acid, or the like to form fine pores, as described in Japanese Patent Application Laid-Open No. 2002-175621. This process gives a porous member having pores partitioned by alumina, an oxide.

In another example, as described in Japanese Patent Application Laid-Open No. 2004-237429, from a structure containing columnar members dispersed in a base member, the columnar members are removed to obtain a porous layer. This example is explained by reference to FIG. 2.

In FIG. 2, the numerals denote members as follows: 10, a substrate; 11, a fine pore; and 12, a base member having fine pores dispersed therein. Such a structure having fine pores can be obtained through the steps below.

Specifically, a structure is provided in which columns are surrounded by another material. The structure contains the material constituting the surrounding region at a content ranging from 20 atom % to 70 atom % based on the total of the columns and the surrounding region. Within the above range of the ratio, a structure can be obtained in which the columnar members are dispersed in the surrounding matrix region. The material constituting the columnar member includes Al, Au, Ag, and Mg. The material for constituting the column-surrounding region includes Si, Ge, mixtures of Si and Ge (hereinafter occasionally represented by "$Si_xGe_{1-x}$" (o<x<1)), and C. The structure having the columnar members dispersed in the surrounding region can be obtained by a non-equilibrium film formation such as sputtering with a target containing materials of both the columnar members and the surrounding region. This is explained later specifically in Examples.

(Filling)

The aforementioned first material filled into the pores and the material for constituting a film formed on the pore wall and pore top portions (the aforementioned second material) may be different from each other or may be the same. For example, in the case of an alloy composed of two metals M1 and M2, M1 is firstly filled into the pores, and thereon a film of M2 is formed, and the structure is heat-treated for alloy formation and ordering. Otherwise two metal materials for the alloy may be filled into the pores and the same materials are allowed to cover the pore wall and the pore top portions. In any method, the material filled into the fine pores and the material covering the pore wall and the pore top portions are preferably connected with each other.

Otherwise, all of the alloy-constituting metals are filled into the pores, and on the porous layer, a film is formed from a material other than the alloy-constituting materials (e.g., Cu, ZnO, or a Cu—Si lamination film), and then the ordering treatment is conducted. Specifically, as shown in FIG. 7C, a filling material 7022 is formed by filling all of the alloy-constituting material into the pores, and thereon a film 7122 is formed from a material which may be different from the alloy-constituting materials.

The filling operation can be conducted by plating, sputtering, or chemical vapor deposition.

When the first material and the second material are different from each other, one of the materials contains at least one of Fe, Co, and Ni, and the other material contains at least one of Pt and Pd. When the first material and the second material are the same, the material includes metal materials containing combination of Fe and Pd; Fe and Pt; Co and Pt; Fe and Pd; and Ni and Pt.

The film containing the alloy-constituting materials which is formed on the pore top portions and pore wall should be substantially continuous without interception, and has a thickness ranging from 1 nm to 1 µm, preferably from 3 nm to 100 nm, still more preferably from 5 nm to 30 nm.

When the alloy-constituting material is filled by plating into the fine pores, the filled material is allowed to overflow preferably from the pores of the porous layer and the material having overflowed from the pores becomes continuous on the pore wall.

The materials which can be filled by plating includes CuAu type or $Cu_3Au$ type hard-magnetic ordered alloys such as FePt, FePd, CoPt, CoPd, $FePd_3$, $Fe_3Pd$, $Fe_3Pt$, $FePt_3$, $CoPt_3$, and $Co_3Pt$.

The alloys constituted of the same elements such as FePt, $Fe_3Pt$, and $FePt_3$ can be prepared selectively by controlling the ratio of Fe and Pt in the plating bath, and the plating conditions.

In the plating bath, the Fe source may be iron chloride or iron sulfate, and the Pt source may be a hexachloroplatinate (IV) salt.

In the plating bath, since Fe ions are relatively instable and liable to form a precipitate, a complexing agent may be added thereto for stabilization of the Fe ions The complexing agent includes tartaric acid, citric acid, succinic acid, malonic acid, malic acid, and gluconic acid; and salts thereof. In particular, preferred are tartaric acid or its salts and/or citric acid or its salts; sodium tartarate and/or ammonium tartarate.

Deterioration of the hexachloroplatinate (IV) salt with time can be effectively prevented by addition of an excess of $Cl^-$ ions of NaCl or the like into the plating solution. The hexachloroplatinate (IV) can further be stabilized in the solution by addition of ammonium ion to form a complex of ammonium hexachloroplatinate (IV) complex.

The intended composition of $Fe_xPt_{1-x}$ is obtained by controlling the ratio of the Fe source and the Pt source to be added to the plating solution and the plating potential. The change of the potential corresponds to the change of the electric current density per area of the working electrode. This current density affects the composition ratio of the plated product to be formed. Incidentally, an additive like a surfactant may be added to the plating solution.

With the aforementioned FePt plating solution, a structure can be obtained which contains a magnetic FePt of 20-80 atom % Fe filled into the fine pores. The constitution of FePt can be confirmed by fluorescent X-ray analysis (XRF), inductively coupled plasma analysis (ICP), or a like method.

For preparation of the CuAu type or $Cu_3Au$ type of hard magnetic ordered alloy containing Co, Ni, Pd, and the like, a plating bath should be synthesized. The plating solution contains at least one of Fe, Co, and Ni. The plating bath containing Co ions or Ni ions is more stable and less liable to form a precipitate than the one containing Fe ions. A hexachloropalladate salt may be used as the Pd source.

The filling operation by a dry process, different from the wet process like plating, is explained below.

The dry process includes sputtering, CVD, and vapor deposition.

In particular, the arc plasma gun method is analogous to an ion-plating process for forming a film from an ionized particulate metal, and is proved to be a film-forming method especially suitable for embedding in wiring for damascene or the like. The arc plasma gun method utilizes arc plasma by a vacuum arc method which generates arcing for melting and ionizing vapor-deposited particles.

The filling density can be improved by applying a bias to the substrate. Another method, like ion-beam sputtering which projects the deposition particles straightly onto the substrate is suitable for filling into fine pores.

However, by the dry process, the film can be formed not only in the fine pores but also on inside walls of the fine pores and pore wall 1012, which can lower the filling density.

Therefore, in filling a material into fine pores of 50 nm diameter or finer by a dry process, the aspect ratio, (pore depth)/(pore diameter), is preferably not more than 5, more preferably not more than 2, still more preferably not more than 1.

The filling density can be improved, as necessary, by conducting alternately a step of removal of a deposit from the pore wall by etching and a step of filling. In filling into the pores by a dry process, some small voids may be formed without disadvantage. However, the aspect ratio, the filling method, and filling conditions are preferably selected not to cause void formation.

One of the above filling step and the film-forming step may be conducted by a dry process employing the alloy-constituting materials, or the both steps may be conducted by the same process.

Figure 7B:
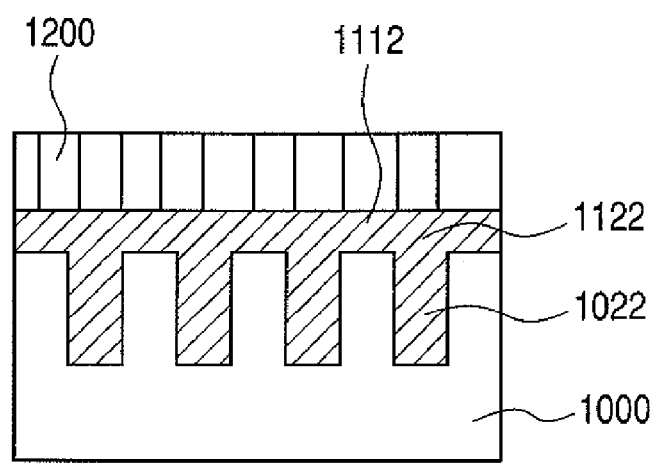
Figure 7C:
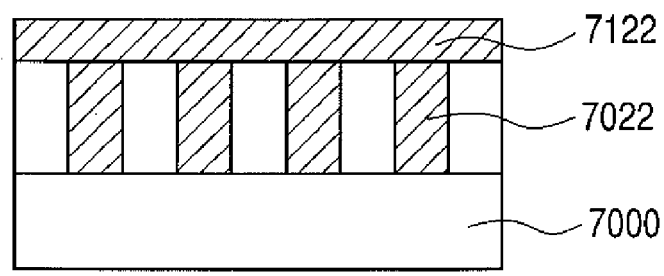

After the film-forming step, namely after formation of the structure shown in FIG. 1B, on the film (1122, 1112), a second film 1200 constituted of a third material may be formed (FIG. 7B).

The second film serves to control orientation of alloy and/or to lower the ordering temperature for the ordered alloy formation.

An example of the second film is a lamination film of ZnO, Cu, or Cu and Si in which the face represented by (001) is oriented.

Another example of the second film is a film of a face-centered cubic structure (fcc) in which the face represented by (001) is oriented (the film having a (001) face on the surface when viewed in the direction perpendicular to the substrate). Other examples are (111) orientation films, MgO(001) orientation films and so forth.

(Heat Treatment)

The base member filled with an alloy-constituting material in the fine pores is heat-treated for ordering the filled alloy at a temperature ranging from 400° C. to 600° C., more preferably from 450° C. to 550° C. In a conventional technique, for ordering, the alloy filled in the fine pores should be treated at a temperature as high as 650° C. According to the present invention, the ordering temperature can be lowered. Naturally, the heat treatment temperature may be lower than 400° C., or the heat treatment may be omitted insofar as the alloy can be ordered.

The heat treatment is preferably conducted in a reductive atmosphere containing, for example, hydrogen. Thereby oxygen as an impurity contained in the filled material can be removed effectively to promote diffusion of the metal atoms.

The ordered alloy in the present invention includes CuAu type ($L1_0$ type) ferromagnetic ordered alloys and $Cu_3Au$ type ($L1_2$ type) ferromagnetic ordered alloys.

The CuAu type alloys include FePd, FePt, and CoPt. The $Cu_3Au$ type alloys include $FePd_3$, $Fe_3Pd$, $Fe_3Pt$, $FePt_3$, $CoPt_3$, $Co_3Pt$, $Ni_3Pt$, and $NiPt_3$. Further, an $L1_1$ type ordered alloy may also be used in the present invention. Such types of ordered structures are described, for example, Japanese Patent Application Laid-Open No. 2002-175621 (in FIG. 8 thereof).

A continuous film of several nanometers thick which is not interrupted by pore wall is known to be ordered at a lower heat treatment temperature. Specifically, an ordered alloy phase can be obtained at 350° C. as shown in the aforementioned known disclosure.

In the present invention, the heat treatment temperature for ordering the filled material is lowered by utilizing a continuous film which can be ordered at a relative low temperature.

In the continuous film, the ordered alloy phase is considered to be formed at a lower temperature owing to smooth diffusion of atoms, although the detailed mechanism is not known. This ordered alloy phase in the thin film induces the ordering of the alloy material in the fine pores. The contact of the material filled in the fine pores with the thin film on the porous layer promotes the diffusion for the ordering similarly as in the continuous film.

(Film Removal)

After the heat treatment, the film formed on the porous layer surface may be removed by polishing or grinding. In particular, for use of the structure of the present invention as the magnetic recording media, the film is removed desirably.

(Structure)

The process for producing the structure of the present invention enables production of a structure in which the ordering degree varies in the depth direction of the fine pores.

Specifically, as shown in FIG. 4E1, in the depth direction, a first region 4623 and a second region 4622 are provided in the depth direction in a columnar pore from the surface side (the side opposite to the substrate). In the first region, the alloy is ordered, whereas in the second region the alloy is ordered at an ordering degree lower than that of the first region, or the alloy is not ordered a non-alloyed region, or ordered structure is different from that of the first region.

The border between the first region and the second region need not be distinct. In perpendicular magnetic recording media employing a soft magnetic layer having a high magnetic permeability under a hard magnetic layer, the soft magnetic layer may be replaced by the second region.

Further, for adjusting a magnetic property (e.g., control of the upper limit of the coercive force), a second region may be utilized which is not ordered or is ordered at a lower ordering degree and has a lower coercive force.

Naturally, the second region may be a non-alloyed region.

The ordered structure of the second region may be different from that of the first region. For example, the first region has an $L1_0$ structure and the second region has an $L1_1$ or $L1_2$ structure.

The filler materials or constitution thereof may be changed within one and the same pore as below.

The second region is an ordered alloy region, and the first region is an alloy region having a lower ordering degree, a non-alloyed region, or a region having an ordered structure different from that of the second region.

In the present invention, the alloy constituting material in the fine pores is ordered starting from the continuous film formed on the porous layer. Therefore, by controlling the heat treatment time, the ordered alloy region (first region), and the alloy region having a less ordering degree or not ordered (second region) can be obtained in one fine pore.

By controlling the lengths of the first region and the second region, the magnetic properties of the structure, such as saturation magnetism and residual magnetization, can be changed without changing the thickness of the fine pores.

(Embodiment of the Present Invention Shown in FIGS. 4A-4E2 to FIGS. 6A-6E2)

A structure of the present invention in which the alloy constituting material filled in the fine pores and the constituting material of the film formed on the porous layer having the fine pores are the same is explained by reference to FIGS. 4A-4E2 and FIG. 5.

FIGS. 4A-4E show the process flow.

Firstly, structure 4000 having fine pores is provided as shown in FIG. 4A. In the drawings, the numerals denote the members as follows: 4050, a porous layer portion; 4055, a non-porous layer portion; 4100, a substrate; and 4150, a layer interposed between the substrate and the porous layer portion. Then a filling material 4022 containing Fe and Pt for formation of the FePt alloy is filled into the pores as shown in FIG. 4B. The plating is continued to form a thin film (continuous film), in a thickness for example about 10 nm, outside on porous layer portion 4050 as shown in FIG. 4C.

Thereafter, heat treatment is conducted to form an ordered alloy phase (FIG. 4D1). The prepared FePt magnetic material immediately after the plating before the heat treatment is an alloy having an fcc phase (the alloy phase being amorphous in some cases), but does not have the order represented by $L1_0$.

In FIG. 4D1, the filled material in the pores of the porous layer has an ordered alloy structure in first region 4623 apart from the substrate. In second layer 4622 near to the substrate side, the ordered alloy structure is not formed or the ordering degree is lower than the first region. In FIG. 4D2, on the other hand, the ordered alloy phase is formed in both of the first region and the second region.

The $Cu_3Au$ type ordered alloy phase ($L1_2$) of $Fe_3Pt$ or $FePt_3$ is formed at a temperature lower than that of the CuAu type ordered alloy ($L1_0$). For formation of an $L1_0$ type ordered alloy of larger anisotropic magnetism, a higher temperature is necessary than for formation of the $L1_2$ type alloy. A higher coercive force (Hc) suitable for magnetic recording media can be obtained by such ordering.

As shown in FIGS. 4D1 and 4D2, an ordered alloy phase can be prepared in upper portions or the entire portions of the columnar structure depending on the film thickness of the porous structure and the heat treatment conditions (temperature and time).

Next, thin film 4112 is selectively removed to obtain a structure in which columns of a CuAu type or $Cu_3Au$ type hard-magnetic ordered alloy are isolated in a matrix of silicon oxide or the like as shown in FIG. 4E1 or 4E2. By precision polishing with a diamond slurry, colloidal silica, or the like, flatness can be achieved with nms (mean square) of roughness of 1 nm or smaller.

Figure 5:
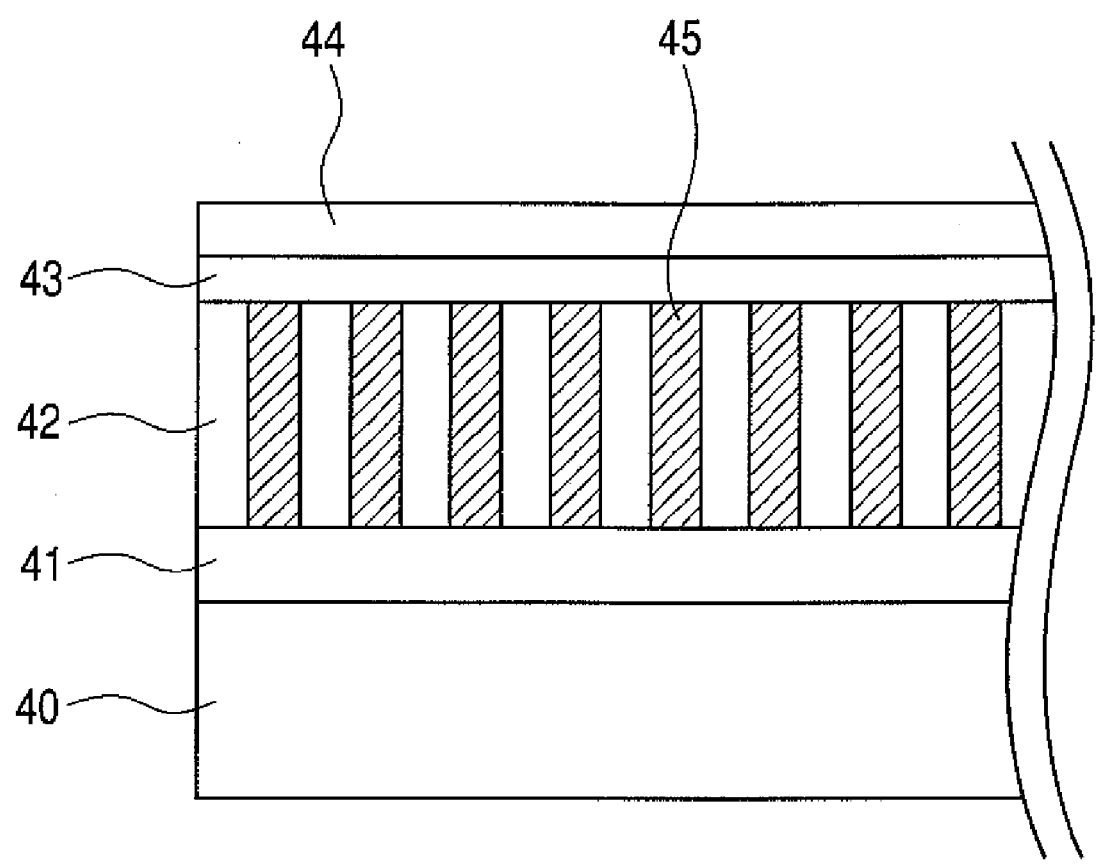
FIG. 5 is a drawing for explaining an example of a constitution of magnetic recording media employing the structure of the present invention.

The aforementioned structure is useful as a magnetic layer of magnetic recording media. FIG. 5 shows an example of the magnetic recording media. The numerals denote the members as follows: 40, a substrate; 41, an underlying electrode layer; 42 a recording layer; 43, a protection layer; and 44, a lubrication layer. Substrate 40 may be a glass plate, an Al plate, or a Si plate. For securing hardness, a NiP film is preferably formed by plating or a like method as an underlayer. Between substrate 40 and recording layer 42, a soft-magnetic layer is effectively formed as a soft underlayer. As the soft underlayer, useful is a film constituted mainly of $Ni_tFe_{1-t}$ (t ranging preferably from 0.65 to 0.91) and the film may contain further Ag, Pd, Ir, Rh, Cu, Cr, P, or B. An amorphous soft magnetic material such as FeTaC and CoZrNb is useful therefor.

On the soft-magnetic layer, an orientation-controlling layer like (001)-oriented MgO is preferably inserted for controlling the orientation of the magnetic material filled in the recording layer. Further on the orientation-controlling layer, an electrode layer for plating is preferably provided. The electrode layer is preferably oriented by utilizing the orientation-controlling layer. ZnO or the like may be used for serving as the orientation-controlling layer and electrode. For controlling the orientation of the magnetic material filled in the pores, the orientation of the underlying electrode layer is selected preferably from (111) and (001). In the magnetic material of the present invention, for orienting the c-axis of the ordered alloy layer in the direction vertical to the substrate board, the underlying electrode layer has preferably a tetragonal crystal orientation parallel to the substrate face. In particular, (001) orientation of an fcc structure is preferably utilized. The recording layer is preferably protected by a surface-protection layer. The surface protection layer is effectively formed from carbon, or a high-hardness non-magnetic material such as carbides and nitrides for abrasion resistance against friction with a head. Additionally, PFPE (perfluoropolyether) is preferably applied thereon as a lubrication layer. The magnetic recording media of the present invention are useful as perpendicular magnetic recording media.

Next, the structure of the present invention in which the material for the film formed on the porous layer having the fine pores is different from the material for the alloy filled in the fine pores is explained by reference to FIGS. 6A-6E2.

FIGS. 6A-6E2 show a flow of a process of an embodiment of the present invention.

As an example, a FePt magnetic material is prepared Structure 4000 as mentioned above having the fine pores is prepared (FIG. 6A). In FIGS. 6A-6E2, the same reference numerals as in FIGS. 4A-4E2 are used for denoting the corresponding members. By a first plating operation, Fe or Pt is filled in the pores of the structure to form filling 6022 in the pores (FIG. 6B). An intermediate layer 4150 may be formed as necessary between the porous layer and the substrate. In particular, when Pt is filled, the filling operation can be conducted not only by electroplating but also by electroless plating. The electroless plating is efficient since hydrogen evolution is not caused in the filling process. After the plating, the top end faces of the fine pores may be uncovered at the surface as necessary Otherwise, on the structure, thin film 6112 is formed as shown in FIG. 6C from a material different from that of the first plating material: Pt onto Fe, or Fe onto Pt. This thin film may be formed by any method including gas-phase methods such as sputtering and vapor deposition, and liquid phase methods such as plating.

Thereafter, the structure is heat-treated to cause counter diffusion at the interface between thin film 6112 and the filling in the fine pores to form a FePt ordered alloy.

In FIG. 6D1, the alloy phase is ordered in first region 6623 of the filling in the fine pores apart from the substrate side in the porous layer. In second region 6622 near to the substrate side, the ordered alloy phase is not formed, or the ordering degree is lower than in the first region. On the other hand, in FIG. 6D2, the ordered alloy phase is formed entirely including the second region.

In the next step, as shown in FIGS. 6E1 and 6E2, the thin film portion is removed by polishing or grinding to prepare a structure useful as a magnetic recording layer Not only the CuAu type of FePt ordered alloy but also the $Cu_3Au$ type ordered alloy such as $Fe_3Pt$ and $FePt_3$ can be formed by controlling the film thickness of the porous nano-structure, the thickness of the thin film, and the heat-treatment conditions. Further, the CuAu type and the $Cu_3Au$ type of ordered alloy can be allowed to coexist separately at the upper portion and lower portion of the pores.

The FePt magnetic material is explained above. However, the material is not limited thereto. Other CuAu type or $Cu_3Au$ type of ordered alloy phases can be formed from other materials.

Further improvement of the properties of the magnetic recording media is explained below.

For use as the recording layer of the magnetic recording media, the alloy phase of the present invention is desirably ordered at a lower temperature.

In the order-disorder transformation of the alloy, the diffusion energy of counter diffusion of the constituting atoms and an elastic energy caused by lattice deformation can affect the activation energy of the ordering.

Addition of a third element like Cu is known to promote crystallization of the ordered alloy to lower the ordering temperature (Japanese Patent Application Laid-Open No. 2002-216330).

Therefore, in the present invention also, addition of Cu or the like to the ordered alloy filled into the fine pores and to the continuous film of the ordered alloy formed on the pore wall can lower the ordering temperature.

Further, the ordering temperature can be lowered by utilizing the deformation energy caused by the lattice deformation of the underlying layer (the layer under the porous layer in the present invention) and difference of the film stress.

In the above techniques, a layer is provided which induces deformation energy (the layer being referred to as a deformation-inducing layer) under the ordered alloy layer When a Cu layer is formed as an underlying layer in a thickness of about 100 nm on the Si substrate, a silicide is formed by the heat-treatment. The deformation energy caused in the silicide formation is effective in lowering the ordering temperature (Applied Physics Letters, Vol. 85, 4430-4432 (2004).

The formation of the deformation-inducing layer on the structure of the present invention, namely the structure containing an ordered alloy in the fine pores and covered with a continuous film on the pore wall, is effective in lowering the ordering temperature of the continuous film and promoting the ordering in the fine pores.

In consideration of the promising perpendicular magnetic recording media having a soft underlayer, aforementioned Si and Cu layer are necessary to be formed between the soft magnetic layer and the recording layer. However, this layer can enlarge the distance between the recording layer and the soft underlayer to lower the recording properties.

In the structure of the present invention, the continuous layer on the pore wall and the deformation-inducing layer can be removed by polishing or an etching process. Therefore the distance between the recording layer containing the ordered alloy in the fine pores and the soft-magnetic layer is not increased, and satisfactory magnetic recording media can be provided.

For use as the recording film, the crystal orientation of the recording medium should be controlled. Therefore, in the above explanation, the orientation is controlled by insertion of an orientation-controlling layer such as MgO between the soft-magnetic layer and the recording layer.

The crystal orientation of the continuous film, which can readily become ordered, can be controlled by formation of an orientation-controlling layer on the continuous film on the pore wall.

The filled material such as FePt in the fine pores not only becomes ordered but also crystal growth is promoted by the orientation of the above-placed continuous film. Thereby, the ordered alloy phase can be obtained with orientation control in the fine pores.

The orientation-controlling layer can be formed from ZnO.

The ZnO film is formed by sputtering with c-axis orientation exhibiting a strong diffraction lines of (002) of XDR by selecting the film formation conditions.

Conventionally, in use of ZnO as the orientation-controlling layer, the oxidation reaction at the interface of the ZnO in the heat treatment causes a problem.

However, in the recording medium from which the upper continuous layer and the orientation-controlling layer are removed, the ordered alloy in the fine pore for the recording layer is not brought into direct contact with the ZnO. Therefore, excellent recording medium can be provided irrespectively of the oxidation reaction at the interface.

In the present invention, the term "a film member-forming step" signifies "a step of forming a first layer constituted of a dispersion of a magnetic substance A in a nonmagnetic material", or "a step of forming, by a physical gas-phase process, a film member constituted of a magnetic substance A mainly composed of one or more elements selected from the group consisting of Fe, Co, and Ni and one or more elements selected from the group consisting of Pt and Pd and a non-magnetic material". The term "a continuous film-forming step" signifies "a step of forming a second layer containing a magnetic substance B on the first layer", or "a step of forming, on the film member, a continuous film containing a magnetic substance B mainly composed of one or more elements selected from the group consisting of Fe, Co, and Ni and one or more elements selected from the group consisting of Pt and Pd". The term "a heat-treatment step" signifies "a step of heating for connecting and ordered-alloying the magnetic substance A and the magnetic substance B during or after the formation of the second layer", or "a heat-treatment step of heating at a prescribed temperature during or after the formation of the continuous film".

Figure 10:
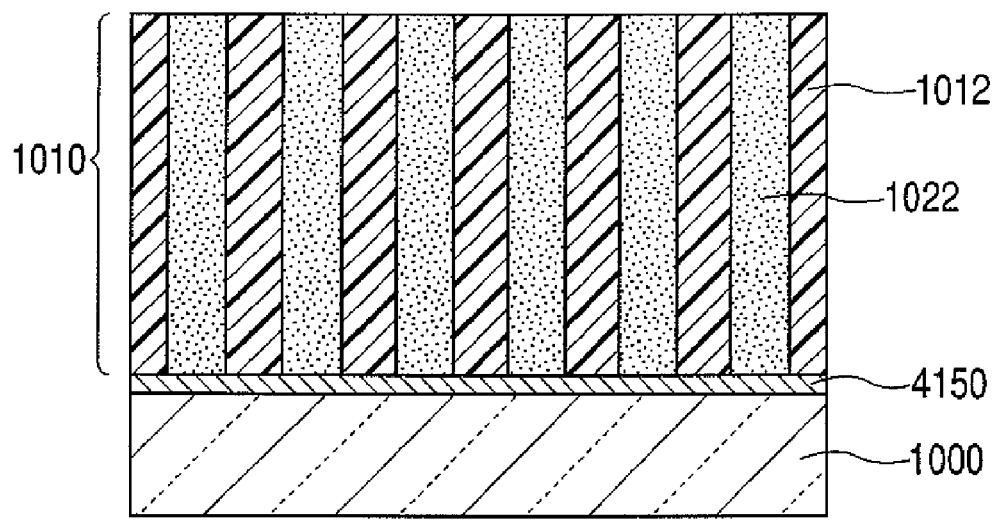
FIG. 10 is a sectional view of a structure in a step of a production process of the present invention.
Figure 11:
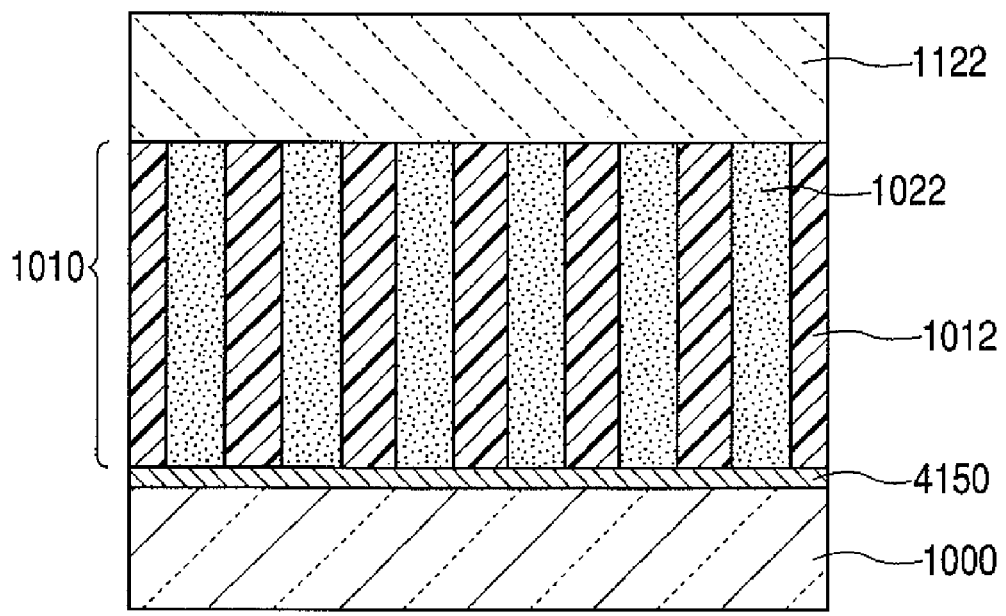
FIG. 11 is a sectional view of the structure in a subsequent step of the production process of the present invention.
Figure 12:
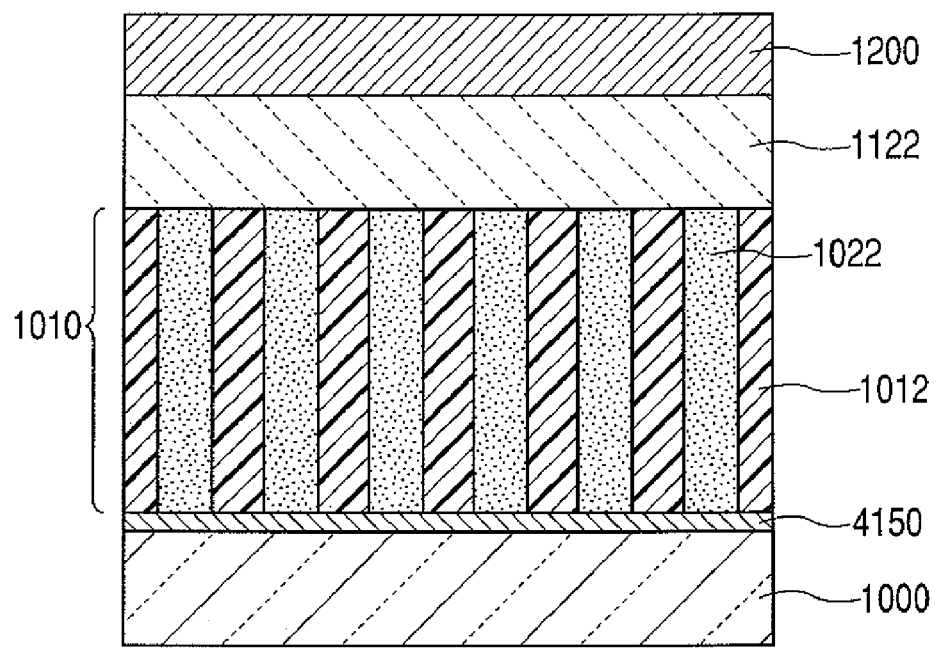
FIG. 12 is a sectional view of the structure in a subsequent step of the production process of the present invention.

A process of production the present invention is described by reference to FIGS. 10, 11, and 12 illustrating schematically the steps of producing a granular structure.

(Film Member-Forming Step)

Firstly as the film member-forming step, a granular structure is prepared as illustrated in FIG. 10. The film member-forming step forms a film member constituted of a magnetic substance A and a nonmagnetic material on a substrate 1000 or an underlayer 4150. The magnetic substance A is mainly composed of at least one element selected from the group consisting of Fe, Co, and Ni and at least one element selected from the group consisting of Pt and Pd. The magnetic substance is exemplified by FePt, FePd, and CoPt having an $L1_0$ crystal structure in which each of the elements grows in layers. This $L1_0$ structure may contain another element such as Cu, Ag, Au, Ir, N, and B, insofar as the structure is retained. The nonmagnetic material includes oxides, nitrides, carbide, Ag, and Au: particularly preferred are oxides such as $SiO_2$, $Al_2O_3$, and MgO.

The c-axis of the $L1_0$ crystal structure is preferably oriented in the normal line direction to the substrate in consideration of use as perpendicular magnetic recording media. For the orientation control, important is the relation between the lattice spacing and the crystal structure of the underlayer and the lattice spacing of the $L1_0$ structure. For example, since the c-axis of $L1_0$-FePt can be readily oriented on MgO(001) orientation film, use of MgO in the granular structure facilitates the c-axis orientation. Therefore, a granular structure is particularly preferred in which FePt is contained in a MgO matrix.

The film member-forming step is conducted by a physical gas-phase process. The physical gas-phase process includes resistance-heating vapor deposition, electron beam vapor deposition, molecular beam epitaxial growth, ion plating, ion beam deposition, and sputtering. Of these processes, the sputtering process which is capable of forming various kinds of thin films are widely used in various production processes. Therefore, the sputtering is preferably employed in the film member-forming step of the present invention.

The granular structure to be formed is described below in more detail. In the description below, an $L1_0$-FePt is used for the $L1_0$ structure, and MgO is used for the nonmagnetic matrix as examples. Granular structures of other combinations are similarly useful as in this example. The film formation is conducted by a sputtering process unless otherwise mentioned, but may be conducted by another process.

Figure 8:
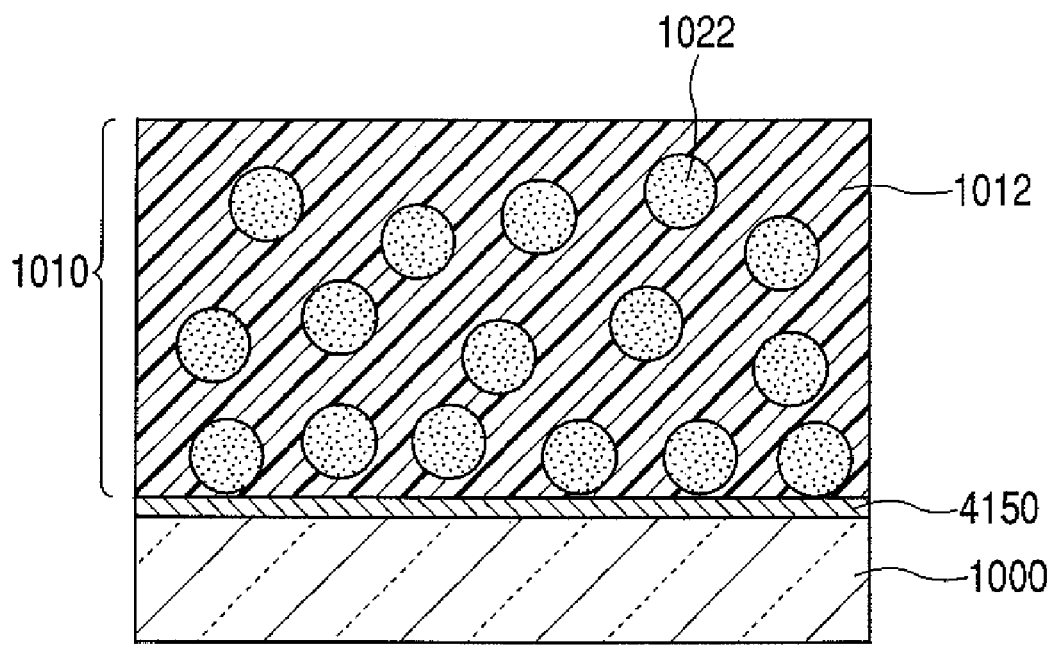
FIG. 8 is a schematic sectional view illustrating a process for production according to the present invention.
Figure 9:
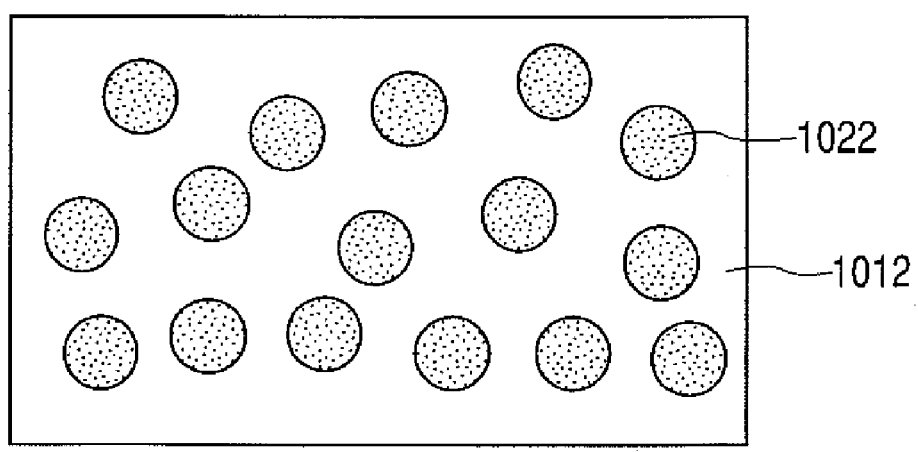
FIG. 9 is a plan view of the structure illustrated in FIG. 10.

FIG. 8 is a sectional view of a structure of the present invention having a granular structure. In the formed film, the FePt crystal grains may be spherical. However, for use of the structure of the present invention as magnetic recording media, the FePt crystal grains have preferably an ordered-alloy-columnar structure as illustrated in FIG. 10. In other words, granular structure 1010 is preferred in which columnar crystal members 1022 are dispersed in matrix member 1012 as illustrated in FIG. 10. Control of the crystal nucleuses of FePt and crystal nucleuses of MgO depositing on the underlying layer 4150 enables formation of a phase-separated structure in which FePt and MgO are deposited respectively on the FePt and MgO crystal nucleuses. In the phase-separated structure, the crystal orientation and crystal grain size can be controlled to some extent by the underlayer to obtain a preferred structure for use as the magnetic recording media The average grain size of the FePt depends on the content ratio of the FePt to the oxide MgO: a higher volume ratio of the oxide gives finer grain size of the FePt. Reportedly, however, crystal grains of the size of 4 nm or less cannot readily be converted into an $L1_0$ ordered alloy. Therefore, an extremely fine grain size is not preferred for lowering of the ordering temperature. The content of the MgO ranges preferably from 35 to 75 vol %, more preferably from 40 to 65 vol %, still more preferably from 45 to 55 vol %. The average grain diameter of the FePt grains before the heat treatment ranges preferably 1 to 8 nm, more preferably from 1 to 5 nm, still more preferably from 1 to 3 nm. The crystal grain size tends to increase by the heat treatment for ordering the alloy. The present invention intends to order the alloy before the crystal grains grow significantly. The crystal grains after the ordered alloy formation has an average grain size ranging from 4 to 10 nm, more preferably from 4 to 8 nm, still more preferably from 4 to 6 nm. In the case where the substrate temperature is elevated during the film formation by sputtering, the crystal grain size becomes larger than in the film formation at room temperature. However, no problem is caused insofar as the above-mentioned size of the crystal grains can be obtained after the ordered alloy formation. The average crystal grain diameter of the columnar structure is represented herein by the average diameter of the top face of the columns (columnar crystal members 1022) as shown in the plan view of the film member illustrated in FIG. 9.

(Continuous Film-Forming Step)

Subsequently, a continuous film 1122 is formed on the above film member in the continuous film-forming step as illustrated in FIG. 11. If necessary, a second continuous film 1200 as illustrated in FIG. 12 is additionally formed. FIG. 11 is a sectional view of a structure of the present invention having a continuous film Continuous film 1122 contains a magnetic substance B which is mainly composed of at least one element selected from the group consisting of Fe, Co, and Ni, and at least one element selected form Pt and Pd. This continuous film is provided to promote the ordering of the alloy of magnetic substance A constituting the granular structure 1010 exemplified by the columnar structure. Magnetic substance A and magnetic substance B may be composed of the same element constitution or may be composed of different element constitution. In consideration of the process loading and the material cost reduction, the magnetic substances A and B are preferably constituted of the same material.

Transformation from a non-ordered fcc structure to an ordered $L1_0$ structure for ordering the alloy is described by taking an FePt alloy as an example. The FePt alloy in a non-ordered phase transforms into a stable $L1_0$ structure during heat treatment by counter diffusion of Fe and Pt as shown in the binary FePt phase diagram. As the results of detailed investigations, a mechanism of the ordering is proposed: (1) crystal nucleuses having formed in an early stage in the ordered phase will grow continuously, and the ordering of the alloy proceeds with the growth of the crystals, and (2) the interface between the non-ordered phase and the ordered phase moves with the ordering of the alloy.

On the other hand, reportedly ease of the ordering of nano-grains depends on the crystal grain size, and in particular, FePt alloys having grain size of 4 nm or less cannot readily be ordered. Presumably, the limited small volume of a nano-grain limits the counter diffusion energy and elastic energy of Fe and Pt which contribute to the alloy ordering to retard the alloy ordering. From the aforementioned mechanism of alloy ordering, the FePt is considered to be more readily ordered in the continuous film than within a small crystal grain in the granular structure. Actually, in many experiments, FePt in a continuous film is shown to be readily ordered at a lower temperature.

In the present invention, the alloy crystal ordering is investigated based on the above-mentioned findings: (1) a small size of the crystal grains is necessary for formation of an ordered alloy grains, (2) the FePt in a continuous film is more readily transformed into an ordered alloy than in the FePt grains in the granular structure, and (3) an ordered alloy crystal grows with movement of the interface between a disordered phase and an ordered phase. Consequently, it was found that in a structure in which FePt columns are connected to FePt constituting a continuous film, the ordering of FePt in the continuous film promotes ordering of the FePt in the crystal grain.

As mentioned later, when the structure of the present invention is used as magnetic recording media, magnetic substance B constituting the continuous film is not necessary for use as the recording layer of the magnetic recording media. Therefore, it is removed or treated for soft-magnetization in preparation of the magnetic recording layer. In the production process of the structure of the present invention, the requirements for the continuous film are as follows:

(1) Structure control such as fine crystallization is not necessary. (2) The continuous film should have a factor for lowering of the ordering temperature of the magnetic substance B (FePt alloy). (3) The continuous film promotes the ordering of the magnetic substance A (FePt alloy) in the granular structure.

The thickness of the continuous FePt film is not limited insofar as the elements constituting the continuous film can readily be transformed into an ordered alloy in the heat treatment step mentioned later. For use of the structure of the present invention as the magnetic recording media, the continuous film is not essential. Therefore, excessive thickness of the continuous film becomes a load in the magnetic recording media production process. Therefore, the thickness ranges 1 to 30 nm, preferably from 1 to 20 nm, more preferably from 1 to 10 nm In the process for producing the structure of the present invention, a step for formation of a second continuous film on the above continuous film may be further provided after the continuous film formation step. This second continuous film serves to lower the temperature for orientation control and/or alloy ordering of the above-mentioned FePt alloy. For example, for use of the structure of the present invention as magnetic recording media, the continuous FePt film is removed. Before the removal, second continuous film 1200 may be additionally provided on the continuous film as shown in FIG. 12, and thereafter heat treatment and the film removal may be conducted.

The second continuous film for the orientation control includes, as specific examples, ZnO films having an oriented (001)-face and films having an fcc crystal structure having an oriented (001)-face (i.e., a film having a (001)-faces as the film surface when viewed perpendicularly to the substrate), a MgO film having a (001)-face oriented. For lowering the ordering temperature, a Cu film, a Ag film, or a Cu/Si lamination film can be used.

In use of the structure of the present invention as perpendicular magnetic recording media having a soft-magnetic layer, the distance between the magnetic head and the soft underlayer is preferably shortened for improvement of recording sensitivity and reduction of cross talk. The FePt continuous film and the second continuous film are removed finally not to cause increase of the distance between the recording layer and the soft-magnetic layer to give excellent magnetic recording media.

(Heat Treatment Step)

In the subsequent step, the structure as illustrated in FIG. 11 or 12 prepared in the above continuous film-forming step is heat-treated. The heat treatment may be conducted simultaneously with the continuous film forming step. In the process for producing a structure according to the present invention, the structure is heat-treated at a prescribed temperature in the film member-forming step, in the continuous film-forming step, or after the continuous film-forming step.

The heat treatment can be conducted after formation of a granular structure as the film member and a continuous film thereon at room temperature, or the heat treatment is conducted during the film formation. The heat treatment after the film formation is advantageous owing to low loading to the production process. On the other hand, generally, in formation of an ordered FePt alloy thin film, heating during the film formation is effective in lowering of the ordering temperature owing to promoted surface diffusion of the Fe and Pt grains by heating. The heat treatment is conducted suitably during the film formation or after the film formation depending on the method for lowering the temperature for ordering the continuous FePt film.

In heat treatment during the film formation, the temperature is selected so that the continuous FePt alloy film covering the film member can be ordered and the columnar FePt in the film member comes to be ordered by promotion by ordering of the continuous FePt film. Specifically the alloy can be ordered in the temperature range between 280° C. to 340° C. The ordering of the alloy is started from a magnetic layer (continuous layer) formed on the phase-separated layer; the ordering in the upper magnetic layer promotes ordering of the alloy of the magnetic substance in the phase-separated layer by action of thermal energy. The effect of the upper magnetic layer enables ordering of the alloy of the magnetic substance in the phase-separated layer at a lower ordering temperature. An unnecessary higher temperature for the alloy ordering is not consistent with the object of the present invention, and causes an adverse effect of increasing the size of the crystal FePt grains in the film member.

In the heat treatment step, the magnetic substance B constituting the continuous film is ordered.

For lowering the ordering temperature, (i.e., heating temperature in the heat treatment step), various methods are known as mentioned before. However, in the present invention, the method for lowering the temperature for ordering the continuous FePt alloy film is not limited to the above-mentioned methods. The use of the continuous film for lowering the ordering temperature enables promotion of ordering of the FePt alloy in the intended granular structure.

The heat treatment may be conducted in a reducing atmosphere containing hydrogen or a like reducing substance A trace amount of an impurity like oxygen, if present, in the FePt can be removed by the heat treatment. This impurity removal is considered to contribute to promotion of diffusion of Fe and Pt atoms to lower the ordering temperature.

(Other Steps)

In the process for producing the structure of the present invention, after the heat treatment step, the continuous film and the second continuous film may be removed by a known method such as polishing and dry-etching (hereinafter called "removal step"). For use of the structure of the present invention as magnetic recording media, the continuous film and the second continuous film are removed. An example of the method for the removal is a precision-polishing employing a diamond slurry or colloidal silica. This precision-polishing enables a surface flatness of an rms (root mean square) of not more than 1 nm of the structure after the removal. After the removal step, some of a bared portion can remain as a damage layer. The damage layer is a soft-magnetic layer not keeping the $L1_0$ structure. The remaining damage layer, if present, would not cause a serious problem, insofar as it does not affect the $L1_0$-FePt constituting the most of the granular structure. On the contrary, the $L1_0$-FePt which has an extremely high magnetic anisotropy constant requires extremely strong head magnetic field for writing with a magnetic head, tending to cause a problem in recording sensitivity. Therefore, a stack construction of a (hard-magnetic $L1_0$-FePt)/(soft-magnetic substance) may contribute improvement of the recording sensitivity.

Instead of or in combination with the removal of the continuous film, the continuous film may be soft-magnetized. In particular, when the FePt continuous film is thin, the $L1_0$-FePt only is soft-magnetized selectively. The soft-magnetization can be conducted by physical impact to destroy the crystal structure or deterioration of the properties of the FePt. The soft-magnetization may be conducted in a chamber of an ICP apparatus (inductive coupled plasma apparatus) by introduction of $CF_4$. The generated reactive fluorine radicals will deteriorate the FePt. In this process, the conditions should be controlled not to affect the $L1_0$-FePt in the necessary film member having the granular structure.

(Magnetic Recording Media)

Figure 13:
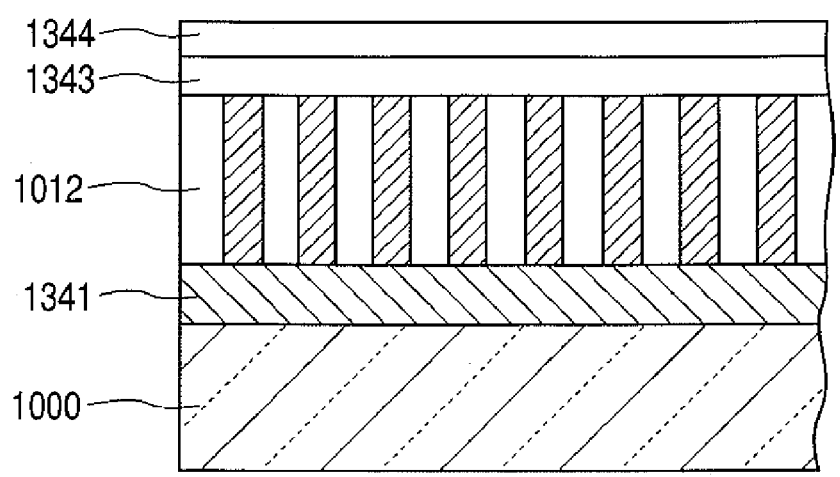
FIG. 13 illustrates a constitution of magnetic recording media employing a structure of the present invention.

The structure prepared as above is useful as a magnetic layer of magnetic recording media. FIG. 13 illustrates magnetic recording media employing a structure of the present invention. In FIG. 13, the numerals denote the followings: 1000, a substrate; 1341, an underlayer and intermediate layer; 1012, magnetic recording layer; 1343, a protection layer; 1344, a lubrication layer. Substrate 1000 includes glass substrates, Al substrates, and Si substrates. For ensuring the hardness, an underlayer is preferably formed from a NiP film by plating or a like method. A soft-magnetic layer is preferably provided as a soft underlayer between substrate 1000 and magnetic layer 1012. The soft underlayer may be formed from a film mainly composed of $Ni_tFe_{1-t}$ (t ranging from 0.65 to 0.91), and may contain Ag, Pd, Ir, Rh, Cu, Cr, P, B, or the like as a minor component. The soft underlayer may be formed from an amorphous soft-magnetic material such as FeTaC, and CoZrNb.

For controlling the orientation of the $L1_0$-FePt, an orientation-controlling layer such as a (001)-oriented MgO layer may be inserted onto the soft-magnetic layer. Further, onto the orientation-controlling layer, a (001)-oriented metal layer such as an epitaxially grown Pt layer may be laminated. Or an (001)-oriented ZnO(001) layer may be laminated thereon. Further a surface protection layer is preferably provided on the recording layer of the present invention. The surface protection layer may be formed from a nonmagnetic high-hardness material such as carbon, carbides, and nitrides for abrasion resistance against friction with a recording head. Further thereon, a PFPE (perfluoropolyether) is preferably applied as a lubrication layer. The magnetic recording media of the present invention are effectively used as magnetic recording media.

Although only some exemplary embodiments of the invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

EXAMPLES

The present invention is described more specifically by reference to Examples.

Example 1

An example is shown of the process for production of a nano-structure of the present invention (FIGS. 4A-4E2)

A Si substrate is used as substrate 4100. On the Si substrate, a Pt film of 20 nm is formed as underlayer 4150. On this underlayer, a thin film of an AlSi structure composed of AlSi is formed in a thickness of 25 nm. (The AlSi in this Example may be replaced by AlGe, or AlSiGe.) According to observation of the thin film of the AlSi structure thin film by FE-SEM (field emission scanning electron microscopy), Al-containing round columns are arranged two-dimensionally in a Si region. The fine pores for formation of the Al-containing columnar member have a diameter of 8 nm, and the average center-to-center interval is 10 nm. This AlSi structure thin film contains Si at a content of 40 atom % based on the total AlSi by inductively coupled plasma spectroscopy.

The above AlSi structure thin film is formed by magnetron sputtering by placing eight Si chips of 15 mm square on a circular Al target of 4-inch diameter (101.6 mm) under the sputtering conditions: RF power source, Ar flow rate of 50 sccm, discharge pressure of 0.7 Pa, input power of 1 kW, and substrate temperature of room temperature (25° C.)

Other AlSi structures of the Si content of 20-70 atom % based on total AlSi can be formed by adjusting the Al/Si ratio. Processes for producing such structures are disclosed in International Patent Application Laid-Open Nos WO03/069677, WO03/078687, WO03/078688, WO03/078685, and so forth.

The formed thin film is immersed in an aqueous 2.8% ammonia solution (pH: 10.8) at a room temperature for about 10 minutes to etch selectively the Al-columnar structure portion to form fine porous member (FIG. 2). The surface of the porous member is observed by FE-SEM. Thereby the structure is confirmed to have pores of 8 nm diameter at intervals of 10 nm. According to further observation of the cross-section of the structure by FE-SEM, the Al-containing column portion is found to have been completely dissolved and the formed nano-holes are partitioned by Si to be independent from each other. No film is observed at the bottoms of the fine pores, suggesting that the underlayer surface is bared. The nano-porous structure produced by this process is partially oxidized to form an oxide $SiO_x$.

Into the pores of the nano-porous structure with the Pt surface of the underlayer bared at the bottoms of the fine pores, an FePt alloy is filled by plating. The plating solution contains 0.011 mol/L hexachloroplatinate (IV) salt, 0.022 mol/L ammonium chloride, 0.02 mol/L iron sulfate, 0.02 mol/L ammonium tartrate, and 0.1 mol/L sodium chloride.

The bath temperature is controlled at 50° C., and the pH is adjusted to 8.

Sodium dodecylsulfate may be added at a concentration of 0.0001 mol/L as a surfactant to the bath. The FePt alloy is filled into the fine pores by plating in the above plating bath.

The constitution of the plated FePt alloy can be controlled by plating conditions. Here, 50 atom % Fe—Pt is formed. By continuing the above plating, an FePt thin film can be formed continuously on the top portions of the FePt columnar structure filled in the fine pores.

In other words, the material deposited and filled in the fine pores comes to overflow out of the pores, and portions of the filling material having overflowed from the fine pores join together on the fine pore tops and the pore walls to form a continuous thin film. In this state, the structure is heat-treated for the ordering.

The thin film should be a continuous film, having a thickness preferably of about 10 nm. Since this thin film is removed after the heat treatment as mentioned below, the thickness is preferably about 10 nm in consideration of the grinding work for the removal and saving of the removed material.

The structure prepared by the above process is heat-treated at 500° C. during 30 minutes. After the heat treatment, the FePt thin film portion is removed by grinding to bare the top portions of the columnar structure The formation of the $L1_0$ structure of the alloy material filled in the fine pores is confirmed by X-ray diffraction peaks of the $L1_0$ structure. Otherwise the formation of the ordered structure can be estimated from the difference in the coercive force from that of the same amount of the magnetic material as mentioned later.

As a comparative example, a columnar structure FePt filled in the fine pores is prepared. The structure of this Comparative Example 1 does not have an FePt alloy thin film on top of the FePt alloy column structure. (That is, the depth of the fine pores is equal to the thickness of the filled material). This prepared structure is heat-treated at 500° C. during 30 minutes. The structure of Example 1 and the structure of Comparative Example 1 are respectively subjected to hysteresis loop measurement by AGM (alternating gradient magnetometer) to measure the difference of the coercive force. The structure of Comparative Example 1 has a coercive force as low as about several hundred Oe, while the structure prepared by the process of Example 1 has a coercive force of not lower than 3000 Oe. Presumably, in the structure of Example 1, an $L1_0$ ordered alloy phase is formed in the thin film portion of the structure, and this ordered alloy phase induces formation of an $L1_0$ ordered alloy phase in the upper portion of the columnar structure. On the contrary, the structure of Comparative Example 1 which does not have the thin film portion as the ordering-promoting portion is presumed to be slow in formation of the $L1_0$ ordered alloy phase.

Thus the structure of Example 1 is useful in production of the magnetic recording media.

In the above description, an $L1_0$-FePt is prepared from an FePt alloy of a 50 atom %-FePt.

A $Cu_3Au$ type alloy such as $Fe_3Pt$ and $FePt_3$ having an $L1_2$ structure can be formed in the fine pores by use of a plating bath of a different ratio of Fe and Pt as the plating source and by controlling the plating conditions.

After formation of the columnar structure by filling an FePt alloy of 50 atom % Fe—Pt in the fine pores as above, the step below can be conducted. That is, after filling into the fine pores, an FePt alloy of 75 atom % Fe—Pt and 25 atom % Fe—Pt different in composition from the above FePt is formed as the thin film to be connected with the columnar structure.

Incidentally, 75 atom % Fe—Pt represents an alloy of the composition of $Fe_{0.75}Pt_{0.25}$.

After heat-treatment of such a composite structure of this constitution, the columnar structure portion has an $L1_0$ structure and the top thin film portion has an $L1_2$ structure. This structure may be polished to make the surface flat with the top thin film portion not completely removed for use as a recording layer of magnetic recording media.

An example is the structure shown in FIG. 7C which has a first magnetic layer 7022 having pores filled with a magnetic material on substrate 7000 and a second magnetic layer 7122 formed further thereon. More specifically, the first magnetic layer is provided on substrate 7000, and the second magnetic layer is provided on the first magnetic layer. In the first magnetic layer, a first magnetic material is distributed in a non-magnetic material, and in the second magnetic layer, the second magnetic material is continuous. The first magnetic material and the second magnetic material are preferably different from each other in a magnetic property, even when the two magnetic materials are constituted of the same elements. Naturally, the two magnetic materials may be different in the constituting elements. Preferably the coercive force of the first magnetic layer is stronger than that of the second magnetic layer by a factor of not less than 5, more preferably not less than 10, still more preferably not less than 50. The structure in which the second magnetic layer is soft-magnetic and the first magnetic layer is hard-magnetic is useful for perpendicular recording media.

The present invention includes such a constitution of the magnetic recording media.

In the above description, the porous layer-containing member having the porous layer portion is formed from Al and Si as the starting member. However, the material is not limited thereto.

For example, the porous layer-containing member may be constituted of columnar aluminum portions composed of aluminum and a partitioning portion constituted of Si, Ge, or SiGe for surrounding the side faces of the columnar aluminum portions.

In the structure, columnar Al portions stand straight in the direction vertical to the substrate, and a Si portion surrounds the side faces of the columns as the matrix. In some cases, a slight amount of Si intermingles with the Al portion, and a slight amount of Al intermingles with the Si portion. This structure is preferably prepared by simultaneous film formation in a non-equilibrium state of Al and Si. The columnar Al portions standing straightly perpendicular to the substrate are selectively dissolved and removed by immersion into an acid or alkali capable of dissolving the Al portions. Acids and alkalis such as phosphoric acid, sulfuric acid, and aqueous ammonia are useful for the dissolution.

The columnar Al portions can also be removed by anodization of the AlSi structure in an aqueous solution like sulfuric acid. During the anodization, the Si portion is oxidized to $(Al_xSi_{1-x})_zO_{1-z}$, where x is in the range of $0<x<0.2$, preferably $0<x<0.1$, and the oxidation state is in the range of $0.334<z<1$, including a non-oxidized state. The anodization is stopped preferably at the time of 30-60 seconds after growth of the pores to reach the underlayer. Otherwise, the anodization may be continued until the electric current of the anodization reaches the minimum. Otherwise, the oxidation may be conducted by annealing in an oxygen atmosphere.

The AlSi structure after removal of Al contains pores of the diameters ranging from 1 nm to 15 nm at pore intervals ranging from 3 nm to 20 nm depending on the composition. As described above, the partition for surrounding the fine pores 11 is constituted of Si or an oxide thereof depending on the means for removal of Al.

Specific examples of the aforementioned structure composed of Si, Ge, or SiGe are disclosed in Japanese Patent Application Laid-Open Nos. 2003-266400, and 2004-179229.

In the above Example 1, FePt alloys are used as the recording medium. However, ordered alloys having high magnetic anisotropy other than FePt, and FePtCu containing an additive like Cu and the like are also useful.

Example 2

An example of the process for producing the nano-structure of the present invention is described (FIGS. 6A-6E2).

A porous member is prepared, in the same manner as in Example 1, through steps of forming a thin film of an AlSi structure on an underlayer, and etching selectively the Al columnar structure portion.

Into the pores of the above-obtained nano-porous structure with the surface of the underlying electrode bared at the bottoms of the pores, a plating material containing at least one of Fe, Co, and Ni is filled by plating. In this Example, Fe is filled. However, other elements can be filled by plating. Fe can be plated in various plating baths. Usually, Fe is plated in a plating bath containing iron chloride, iron sulfate, or a mixture thereof. However, a stable Fe plating bath can be prepared by use of iron sulfamate, iron tartrate, iron citrate, or the like forming a complexes in the solution. Excessive plating outside the pores should be avoided. The excess plated portion having overflowed should be removed by grinding or a like method to bare the top faces of the columnar structure filled in the pores.

Thereon, a film of a metal like Pt or Pd is formed which is capable of forming a CuAu type or $Cu_3Au$ type ordered alloy with the above employed Fe, Co, or Ni. The film may be formed by plating, sputtering, or vapor deposition. In this Example, the film is formed by plating Pt can be plated in various plating baths similarly as the Fe plating. The plating bath is selected which does not dissolve the Fe on the underlying surface. Here a solution of cyclohexachloroplatinic acid having pH adjusted to 7 by sodium hydroxide is employed. The plating thickness ranges preferably from about 10 nm to about 20 nm.

After the plating, the structure is heat-treated at 550° C. during 30 minutes to form a CuAu type or $Cu_3Au$ type ordered alloy phase by counter diffusion at the Pt/Fe interface. Thereafter the surface is polished to remove the surface thin film to bare the top face of the columnar structure. The coercive force Hc of the structure is about 3000 Oe by AGM measurement.

In this Example 2, since a large volume of the Pt thin film is formed on the top of the columnar structure, the counter diffusion occurs to cause readily the ordering in comparison with Comparison Example 1 in which the ordering is caused by diffusion of Fe and Pt within the limited columnar structure. In this Example, the ordered alloy phase can be formed in limited upper portions of the columnar structure or in the entire of the columnar structure by controlling the film thickness of the firstly prepared AlSi structure, heat treatment temperature, and other conditions.

Magnetic recording media can be prepared by using the structure of this Example 2 as the recording medium.

Example 3

An example of the process for producing the nano-structure of the present invention is described (FIGS. 6A-6E2).

A porous member is prepared through steps of forming a thin film of an AlSi structure on an underlayer, and etching selectively the Al columnar structure portion. The underlayer herein serves as an electrode layer in electroplating or a catalytic layer in electroless plating depending on the process.

Into the pores of the above-obtained nano-porous structure with the surface of the underlying electrode bared at the bottoms of the pores, a plating material containing at least one of Pt and Pd is filled by plating. Pt and Pd can be deposited either by electroplating or electroless plating. In the electroless plating, since the electric conductivity in not necessary, the thickness of the underlayer may be several nanometers. The underlayer is Pd of 5 nm thick. In this Example, a commercial electroless Pt-plating bath is employed. This electroless Pt-plating solution is prepared by mixing (1) Electroless Pt 100 Basic Solution: 100 mL, (2) aqueous 2.8% ammonia solution: 10 mL, (3) Lectroless Pt 100 Reducing Solution: 2 mL, and (4) pure water: 88 mL. The pH of the plating solution is 11. Pt is filled into the pores with this plating solution kept at 60° C. The excess of Pt is removed by polishing or a like operation to bare the top face of the columnar structure in the same manner as in Example 2.

Then, a film of a metal like Fe, Co, or Ni is formed which is capable of forming a CuAu type or $Cu_3Au$ type ordered alloy with Pt on the face of the above structure. The film may be formed by plating, sputtering, or vapor deposition. In this Example, FePt plating is conducted. Fe plating is conducted in the same manner as in Example 1. The film thickness is about 10 nm.

After the plating, the structure is heat-treated at 550° C. during 30 minutes to form a CuAu type or $Cu_3Au$ type ordered alloy phase by counter diffusion at the Pt/Fe interface. Thereafter the surface is polished to remove the surface thin film to bare the top faces of the columnar structure. The coersive force Hc of the structure is about 3000 Oe or more by AGM measurement.

In this Example 3, since a large volume of the Fe thin film is formed on the top of the columnar structure, the counter diffusion readily occurs to cause readily the ordering in comparison with Comparison Example 1 in which the ordering is caused by diffusion of Fe and Pt within the limited columnar structure. In this Example, the ordered alloy phase can be formed either in limited upper portions of the columnar structure or in the entire of the columnar structure by controlling the film thickness of the firstly prepared AlSi structure, heat treatment temperature, and other conditions.

Magnetic recording media can be prepared by using the structure of this Example 3 as the recording medium.

Example 4

Filling by Dry Process

An example of the process for producing the nano-structure of the present invention is described.

A porous member is formed in the same manner as in Example 1.

A Si substrate is used as substrate 4100 shown in FIGS. 4A-4E2. On the Si substrate, a MgO film of 10 nm thick is formed as underlayer 4150. On the underlayer, an AlSi structure thin film of 15 nm thick is formed. (The AlSi portion of this Example may be replaced by AlGe or AlSiGe.) In this AlSi structure film, plural Al columns are surrounded by a Si matrix.

According to observation by FE-SEM (field emission scanning electron microscopy) of this AlSi structure thin film, Al-containing round columnar members are arranged two-dimensionally in the Si matrix. The fine pores for formation of the Al-containing columns has pore diameters of 8 nm. The average interval between the pore centers is 10 nm.

The formed thin film is immersed in an aqueous 2.8% ammonia solution (pH: 10.8) for 10 minutes to etch selectively the Al column structure portions to form a porous member (FIG. 2). According to observation of the surface of the porous member by FE-SEM, the pores have a diameter of 8 nm, and are distributed at intervals of 10 nm Further, according to FE-SEM observation of the sectional structure, Al-containing column portions have completely been dissolved, and the nano-holes are independently separated by Si. No residual film is observed on the pore bottoms, this suggesting that the underlayer surface is bared. The nano-porous member prepared by this procedure is an oxide $SiO_x$ owing to partial oxidation in the etching step.

The pores of this porous member are filled completely with an FePt alloy by an arc plasma gun method and further thereon a continuous film of FePt is formed in a thickness of 5 nm. The formed continuous film has a rough surface with the thickness of the continuous film larger on the pore wall portion.

The structure prepared as above is heat-treated at 500° C. during 30 minutes, and thereafter the FePt continuous film portion is polished away to bare the top portion of the columnar structure. The coercive force Hc of the structure is not less than 3000 Oe by AGM measurement.

Example 5

Formation of Orientation-Controlling Layer on Porous Layer

An example of the process for producing the nano-structure of the present invention is described.

In the same manner as in Example 1, a porous member is formed, a material for formation of an ordered alloy is filled in the fine pores, and a continuous film is formed on the pore wall.

An example of an FePt alloy is described here. However, an ordered alloy having a high magnetic anisotropy other than the FePt, or FePtCu or the like containing a third additive like Cu may be used in place of the FePt alloy.

The structure shown in FIG. 1B is formed. On this structure, as shown in FIG. 7B, a ZnO layer (1200 in FIG. 7B) is formed as an orientation-controlling layer by sputtering.

The ZnO is formed in a film thickness of 40 nm by magnetron sputtering in an argon atmosphere of 15 mTorr at a substrate temperature of 300° C. The XRD diffraction pattern shows a large peak of (002) of ZnO and growth of ZnO oriented in the c-axis on the disordered FePt layer.

Then the structure is heat-treated at 500° C. during 30 minutes. Thereby, the continuous film and the filled FePt come to be ordered. The XRD diffraction pattern shows large peaks of (001) and (002) showing c-axis orientation of FePt. Thus it is confirmed that the orientation of FePt can be controlled by ZnO formed on the top. After removal of the laminated matter containing ZnO on the pore wall by polishing also, the XRD diffraction pattern shows c-axis orientation of FePt similarly as above. This shows that the filled FePt is also orientation-controlled.

Example 6

Formation of Ordering Temperature-Lowering Layer on Porous Layer

An example of the process for producing the nano-structure of the present invention is described.

In the same manner as in Example 1, a porous member is formed, a material for formation of an ordered alloy is filled into the fine pores, and a continuous film is formed on the pore wall with an FePt alloy. The structure shown in FIG. 1B is formed. In formation of the FePt alloy by plating, the structure is heat-treated in a hydrogen-reducing atmosphere at 300° C. to remove impurity, especially a hydroxide. When the FePt is formed by a dry process, this heat treatment is not necessary. On this structure, continuous film 1200 is formed as a buffer layer constituted of 20-nm Pt, 30-nm Cu, and 10-nm Si formed in this order. After the film formation, the structure is heat treated at 400° C. during 30 minutes, and then the continuous FePt thin film portion is removed by grinding to bare the top portion of the columnar structure. A strain energy of Cu silicide formed at about 300° C. promotes the ordering of FePt. The coersive force Hc is not less than 3000 Oe by AGM measurement. The upper strain-inducing layer formed from the Cu and Si layers can lower the ordering temperature for the FePt ordered alloy phase formation in the pores.

Example 7

(Step 1)

On Si substrate 1000 having a thermal oxidation film, a MgO film of 20 nm thick is formed by sputtering as underlayer 4150 to have the (001)-face oriented.

Subsequently, film member 1010 which is constituted of FePt alloy crystal grains and a MgO matrix is formed on underlayer 4150 by DC or RF sputtering. The sputtering film-forming apparatus is driven at a base pressure not higher than $2\times10^{-5}$ Pa with a composite target of $Fe_{50}Pt_{50}$ (i.e., $Fe_{0.5}Pt_{0.5}$) with Fe chips arranged thereon symmetrically, and a MgO target. Film members A, B, and C of 25 nm thick are prepared at the ratios of the FePt alloy to MgO by volume of 20:80, 35:65, and 50:50.

The surface construction of each of the film members is examined by transmission electron microscopy (TEM). The film member A does not have a clear granular surface construction. The film member B contains FePt crystal grains of an average grain diameter of about 3 nm. The film member C contains FePt crystal grains of an average grain diameter of about 5 nm.

The construction of the cross-section of each of the film member is examined by TEM. The film member A does not have a clear columnar construction. The film members B and C contain columnar FePt dispersed in the MgO matrix clearly. By examination by X-ray diffraction (XRD), the film members B and C have no peak of the ordered $L1_0$-FePt.

(Step 2)

On each of the film members formed on substrate 1000 kept at temperature of 300° C., a FePtCu thin film is prepared in a thickness of 20 nm as continuous film 1122. The target material employed is Cu-containing FePt. The formed thin film has composition of $Fe_{42}Pt_{46}Cu_{12}$ by fluorescence X-ray spectrometry (XRF).

(Step 3)

Each substrate 1000 is kept at 300° C. for 30 minutes (Step 4)

Each of continuous films 1122 is removed by polishing to obtain structure samples A1, B1, and C1 containing respectively the film member A, B, or C.

After the polishing, properties of FePt crystal grains on the film member surface are observed by TEM.

The average size of the crystal grains in Sample A1 is 3 nm; that in Sample B1 is 5 nm; that in Sample C1 is 8 nm.

Diffraction analysis shows diffraction peaks of ordered phase of $L1_0$-FePt in Samples B1 and C1, but no clear diffraction peak in Sample A1.

The coercive force (Hc) perpendicular to the substrate is not higher than 100 Oe in Sample A1; 3500 Oe in Sample B1; and 4500 Oe in Sample C1.

Example 8

(Step 1)

Film members A, B, and C are prepared which contain respectively a FePt alloy and MgO in volume ratios of 20:80, 35:65, and 50:50 in the same manner as in Example 7.

(Step 2)

On each of the samples formed on substrate 1000 kept at temperature of 300° C., Fe layers of 2 nm thick and Pt layers of 2 nm thick are laminated alternately in a total lamination thickness of 20 nm to form continuous film 1122.

(Step 3)

The substrates are kept at a temperature of 300° C. for 30 minutes in the same manner as in Example 7.

(Step 4)

Continuous films 1122 are removed by polishing to obtain structure samples A2, B2, and C2 containing respectively the film member A, B, or C.

After the polishing, TEM examination shows that Sample A2 contains the crystal grains of an average size of 3 nm; Sample B2, 5 nm; and Sample C2, 8 nm.

Diffraction analysis shows diffraction peaks of an ordered phase of $L1_0$-FePt in Samples B2 and C2, but no clear diffraction peak in Sample A2.

AGM measurement shows that the coercive force (Hc) perpendicular to the substrate is not higher than 100 Oe in Sample A2; 3000 Oe in Sample B2; and 4000 Oe in Sample C2.

Example 9

(Step 1)

Film members A, B, and C are prepared which contain respectively an FePt alloy and MgO in volume ratios of 20:80, 35:65, and 50:50 in the same manner as in Example 7.

(Step 2)

On each of the samples, Fe layers of 2 nm thick and Pt layers of 2 nm thick are laminated alternately at room temperature in a total lamination thickness of 30 nm to form continuous film 1122. Further thereon, as second continuous film 1200, a buffering Pt layer of 10 nm thick, a Cu layer of 50 nm thick, and a Si layer of 30 nm thick are formed in the named order.

(Step 3)

Substrates 1000 are kept in a hydrogen atmosphere at a temperature of 300° C. for 30 minutes.

(Step 4)

Continuous films 1122 and second continuous films 1200 are removed by polishing to obtain structure samples A3, B3, and C3 containing respectively the film member A, B, or C.

After the polishing, TEM examination shows that Sample A3 contains crystal grains of the average size of 3 nm; Sample B3, 6 nm; and Sample C3, 9 nm.

Diffraction analysis shows diffraction peaks of an ordered phase of $L1_0$-FePt in Samples B3 and C3, but no clear diffraction peak in Sample A3.

AGM measurement shows that the coercive force (Hc) perpendicular to the substrate is not higher than 1000 Oe in Sample A3; 4000 Oe in Sample B3; and 5500 Oe in Sample C3.

Example 10

(Step 1)

Film members A, B, and C are prepared which contain respectively an FePt alloy and MgO in volume ratios of 20:80, 35:65, and 50:50 in the same manner as in Example 7.

(Step 2)

On each of the samples prepared in the above Step 1, FePt continuous layer 1122 of 30 nm thick is formed at room temperature.

(Step 3)

In this step, a He ion beam of 2 MeV is projected onto the film formed in Step 2 instead of the heat treatment. The substrate temperature rises in this step by the He ion irradiation, but the maximum temperature is not higher than 280° C.

(Step 4)

Continuous films 1122 formed in Step 2 are removed by polishing to obtain structure samples A4, B4, and C4 containing respectively the film member A, B, or C. After the polishing, TME examination shows that Sample A4 contains the FePt crystal grains of 3 nm; Sample B4, 6 nm; and Sample C4, 9 nm. Diffraction analysis shows diffraction peaks of an ordered phase of $L1_0$-FePt in Samples B4 and C4, but no clear diffraction peak in Sample A4. AGM measurement shows that the coercive force (Hc) perpendicular to the substrate is not higher than 100 Oe in Sample A4; 4000 Oe in Sample B4; and 5500 Oe in Sample C4.

Example 11

(Step 1)

Film members A, B, and C are prepared which contain respectively an FePt alloy and MgO in volume ratios of 20:80, 35:65, and 50:50 in the same manner as in Example 7.

(Step 2)

On each of the samples prepared in the above Step 1, continuous FePt film 1122 (20 nm thick) is formed by laminating alternately Fe monoatomic layers and Pt monoatomic layers at room temperature. Further thereon, a Ag thin film of 20 nm thick is formed as second continuous film 1200.

(Step 3)

The layers with the substrate are heat-treated in a reducing hydrogen atmosphere at 300° C. for 30 minutes.

(Step 4)

The continuous films formed in Step 2 are removed by polishing to obtain structure samples A5, B5, and C5 containing respectively the film member A, B, or C. After the polishing, TEM examination shows that Sample A5 contains the crystal grains of an average size 3 nm; Sample B5, 5 nm; and Sample C5, 8 nm. Diffraction analysis shows diffraction peaks of an ordered phase of $L1_0$-FePt in Samples B5 and C5, but no clear diffraction peak in Sample A5. AGM measurement show that the coercive force (Hc) perpendicular to the substrate is not higher than 1000 Oe in Sample A5; 3000 Oe in Sample B5 and 4000 Oe in Sample C5.

Example 12

(Step 1)

Film members A, B, and C are prepared which contain respectively an FePt alloy and MgO in volume ratios of 20:80, 35:65, and 50:50 in the same manner as in Example 7.

(Step 2)

On each of the samples prepared in the above Step 1, continuous FePt film 1122 (20 nm thick) is formed by laminating alternately Fe monoatomic layers and Pt monoatomic layers at room temperature. On this continuous film, a ZnO thin film of 40 nm thick is formed as a second continuous film at a substrate temperature of 300° C.

(Step 3)

The layers with the substrate are heat-treated at a temperature of substrate 1000 of 300° C. for 30 minutes.

(Step 4)

The continuous film 1122 and second continuous film 1200 formed in Step 2 are removed by polishing to obtain structure samples A6, B6, and C6 containing respectively the film member A, B, or C. After the polishing, the TEM examination shows that Sample A6 contains FePt crystal grains of 3 nm; Sample B6, 5 nm; and Sample C6, 8 nm. Diffraction analysis shows diffraction peaks of an ordered phase of $L1_0$-FePt in Samples B6 and C6, but no clear diffraction peak in Sample A6. AGM measurement shows that coercive force (Hc) perpendicular to the substrate is not higher than 100 Oe in Sample A6; 3000 Oe in Sample B6 and 4000 Oe in Sample C6.

Orientation distribution in Sample C6 and Sample C2 in the c-axis direction is observed by XRD. The rocking curve of the diffraction peak at the (001)-face of $L1_0$-FePt is taken as the index of the orientation distribution. The half width is smaller in Sample C6 than in Sample C2, indicating narrower orientation distribution in Sample C6.

Comparative Example 2

(Step 1)

Film members A, C, and D are prepared in the same manner as in Example 7 except that the ratios of the FePt alloy to MgO by volume are changed to 20:80, 50:50, and 70:30.

The surface structure of each of the film members is examined by transmission electron microscopy (TEM). The film member A does not have a clear granular structure on the surface. The film member C contains FePt crystal grains of an average grain diameter of about 5 nm. The film member D contains FePt crystal grains of an average grain diameter of about 15 nm.

The cross-section of each of the film member is examined by TEM. The film member A does not have a clear columnar structure. The film members C and D contain columnar FePt dispersed in the MgO matrix clearly.

(Step 2)

The continuous film is not prepared in this Comparative Example.

(Step 3)

The layers with the substrate are heat-treated at the temperature of substrate 1000 of 300° C. for 30 minutes to obtain structure samples AR, CR, and DR having respectively film member A, C, or D.

(Step 4)

AGM measurement shows that Sample AR has s coercive force (Hc) perpendicular to the substrate of not higher than 100 Oe; Sample CR, not higher than 5000 Oe; and Sample DR, 3000 Oe.

The grain size of FePt crystals is measured by TEM. The average grain size is 25 nm, and the grain size distribution is broad.

Example 13

Magnetic recording media are produced by employing the production process of Example 7. A glass plate of 2.5 inches is used as the substrate. Thereon a soft underlayer is formed from an amorphous soft-magnetic CoZrNb. Further thereon, a MgO layer is formed in a thickness of 5 nm. A recording layer is prepared through the process shown in Example 7. Further thereon, DLC is prepared as a protection layer, and PFPE (perfluoropolyether) is applied to form a lubrication layer. The above film-forming process is conducted at a temperature of not higher than 300° C., which enables formation of the magnetic recording media on a glass substrate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-102597, filed Mar. 31, 2005, 2005-270286, filed Sep. 16, 2005 and 2006-128357, filed May 2, 2006 which are hereby incorporated by reference herein in their entirety.

What is claimed is:

1. A process for producing a magnetic recording media containing an ordered magnetic alloy in pores in a porous layer comprising in sequence the steps of:
   providing a porous layer-containing member having a porous layer on the surface thereof,
   filling a first material into pores of the porous layer,
   forming on the porous layer-containing member a continuous film of 5-30 nm in thickness from a second material to be connected with the filled first material and to cover the openings of the pores and the remaining portions of the porous layer other than the openings, so that the continuous film is not divided by the remaining portions of the porous layer,
   heat-treating the porous layer-containing member with the first material and the continuous film at a temperature from 450° C. to 550° C. to form an ordered magnetic alloy containing the first and the second material, and
   removing a part of the ordered magnetic alloy on the remaining portions of the porous layer after the heat-treating, so that the ordered magnetic alloy is divided by the remaining portions of the porous layer.

2. The process for producing a magnetic recording media according to claim 1, wherein the first material and the second material are different from each other.

3. The process for producing a magnetic recording media according to claim 1, wherein one of the first material and the second material contains at least one element selected from the group consisting of Fe, Co and Ni, and the other one of the first material and the second material contains at least one of the elements of Pt and Pd.

4. The process for producing a magnetic recording media according to claim 1, wherein the first material and the second material are the same.

5. The process for producing a magnetic recording media according to claim 1, wherein the ordered magnetic recording media of the ordered alloy is an $L1_0$ type magnetic recording media or an $L1_2$ type magnetic recording media.

6. The process for producing a magnetic recording media according to claim 1, wherein the pores of the porous layer are columnar, having an average diameter ranging from 1 nm to 40 nm.

7. The process for producing a magnetic recording media according to claim 1, wherein the pore-filling step and the film-forming step are conducted by plating the material constituting the alloy.

8. The process for producing a magnetic recording media according to claim 7, wherein the plating treatment is conducted to allow the material to overflow from the pores of the porous layer and to allow the material having overflowed to join together to be continuous on the other portions than the openings of the pores.

9. The process for producing a magnetic recording media according to claim 1, wherein at least one of the pore-filling step and the film-forming step is conducted by a dry process by use of the material constituting the alloy.

10. The process for producing a magnetic recording media according to claim 1, wherein the process further comprises, after the film-forming step, a step for forming a second film containing a third material on the film.

11. The process for producing a magnetic recording media according to claim 10, wherein the second film serves to lower the temperature for orientation control and/or ordering of the alloy.

12. The process for producing a magnetic recording media according to claim 10, wherein the second film is selected from films of ZnO, MgO, and Cu, and lamination films of Cu and Si.

13. The process for producing a magnetic recording media according to claim 10, wherein the second film is a face-centered cubic film in which the face represented by (001) is oriented.

14. The process for producing a magnetic recording media according to claim 1, wherein the heat-treating step is conducted in a reductive atmosphere.

* * * * *